United States Patent
Hong et al.

(10) Patent No.: US 12,181,211 B2
(45) Date of Patent: *Dec. 31, 2024

(54) HOME APPLIANCE AND REFRIGERATOR

(71) Applicant: LG Electronics Inc., Seoul (KR)

(72) Inventors: Yoonjung Hong, Seoul (KR); Heekyung Kang, Seoul (KR); Yongbeom Ma, Seoul (KR); Kunwoo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/388,406

(22) Filed: Nov. 9, 2023

(65) Prior Publication Data

US 2024/0077252 A1 Mar. 7, 2024

Related U.S. Application Data

(63) Continuation of application No. 17/975,938, filed on Oct. 28, 2022, now Pat. No. 11,852,402.

(30) Foreign Application Priority Data

Oct. 29, 2021 (KR) .................. 10-2021-0146677

(51) Int. Cl.
*F25D 27/00* (2006.01)
*F21V 23/04* (2006.01)
*F25D 23/02* (2006.01)

(52) U.S. Cl.
CPC ........ *F25D 27/005* (2013.01); *F21V 23/0435* (2013.01); *F21V 23/0464* (2013.01);
(Continued)

(58) Field of Classification Search
CPC .. F25D 27/005; F25D 27/00; F25D 2327/001; F25D 2327/00; F25D 2700/04
See application file for complete search history.

(56) References Cited

U.S. PATENT DOCUMENTS 6,804,974 B1 * 10/2004 Voglewede ........... F25D 23/126
362/276
7,832,224 B2 * 11/2010 Roo ...................... F25D 27/005
362/127
(Continued)

FOREIGN PATENT DOCUMENTS

CN     103250018     8/2013
CN     113074487     7/2021
(Continued)

OTHER PUBLICATIONS

Office Action in Korean Appln. No. 10-2023-0145652, mailed on Dec. 22, 2023, 8 pages (with English translation).
(Continued)

*Primary Examiner* — William N Harris
(74) *Attorney, Agent, or Firm* — Fish & Richardson P.C.

(57) ABSTRACT

A home appliance includes a cabinet having a space, a door configured to open and close the space and including a light source, an illuminance sensor provided in the cabinet or the door and configured to detect illuminance, a user detection sensor provided in the cabinet or the door and configured to detect user proximity, and a controller configured to control the light source based on information detected by the user detection sensor, wherein, when a user is detected to approach the home appliance within a reference distance by the user detection sensor, the controller controls the light source of the door to be changed from a first state to a second state, and the reference distance is changeable based on one or more of an illuminance and current time detected by the illuminance sensor.

20 Claims, 12 Drawing Sheets

(52) U.S. Cl.
CPC ........ *F21V 23/0471* (2013.01); *F25D 23/028* (2013.01); *F25D 2327/001* (2013.01); *F25D 2700/04* (2013.01)

(56) References Cited

U.S. PATENT DOCUMENTS

| | | | |
|---|---|---|---|
| 8,109,301 | B1 | 2/2012 | Denise |
| 8,789,900 | B2 | 7/2014 | Laible et al. |
| 9,696,085 | B2 * | 7/2017 | Seo .................. F25D 11/02 |
| 11,092,378 | B1 | 8/2021 | Small |
| 2009/0090120 | A1 | 4/2009 | Roo et al. |
| 2014/0111118 | A1 | 4/2014 | Kendall et al. |
| 2021/0396454 | A1 | 12/2021 | Cho et al. |

FOREIGN PATENT DOCUMENTS

| | | |
|---|---|---|
| JP | 2008-138865 | 9/2018 |
| KR | 200302863 | 1/2003 |
| KR | 10-2007-0077721 | 7/2007 |
| KR | 10-2007-0113049 | 11/2007 |
| KR | 10-2012-0134443 | 12/2012 |
| KR | 10-2013-0121533 | 11/2013 |
| KR | 10-2016-0149605 | 12/2016 |
| KR | 10-2017- 0027565 | 3/2017 |
| KR | 10-2017-0054741 | 5/2017 |
| KR | 10-2017-0105707 | 9/2017 |
| KR | 10-2018-0025040 | 3/2018 |
| KR | 10-2019-0036746 | 4/2019 |
| KR | 10-2019-0137473 | 12/2019 |

OTHER PUBLICATIONS

Extended European Search Report in European Appln. No. 22204292.1, mailed on Apr. 3, 2023, 9 pages.
Notice of Allowance in Korean Appln. No. 10-2021-0146677, mailed on Jul. 28, 2023, 16 pages (with English translation).
Office Action in Korean Appln. No. 10-2021-0146677, mailed on Apr. 18, 2023, 112 pages(with English translation).

* cited by examiner

HOME APPLIANCE AND REFRIGERATOR

CROSS-REFERENCE TO RELATED APPLICATIONS

The present application is a continuation of U.S. application Ser. No. 17/975,938, filed on Oct. 28, 2022, which claims priority under 35 U.S.C. 119 and 35 U.S.C. 365 to Korean Patent Application No. 10-2021-0146677, filed on Oct. 29, 2021, which are hereby incorporated by reference in their entirety.

TECHNICAL FIELD

The present disclosure relates to a home appliance and a refrigerator.

BACKGROUND

In general, a refrigerator is a home appliance for storing foods in an internal storage space, which is shield by a refrigerator door, at a low temperature by low temperature air. The refrigerator cools the inside of the storage space using cool air generated by heat-exchanging with a refrigerant that circulates a cooling cycle to store the foods in an optimum state.

Such refrigerators tend to increase more and more in size and provide multi-functions due to the trends of change of dietary life and high quality, and accordingly, refrigerators provided with various structures and convenience devices in consideration of user convenience are brought to the market.

In order to harmonize with an environment in which the refrigerator is disposed or with surrounding furniture or home appliances, technologies structures for varying an outer appearance of a door front of the refrigerator are developed, and this trend is the same throughout the home appliance.

U.S. Pat. No. 8,789,900 (Cited Reference 1) discloses a structure in which a decoration panel forming an outer appearance is installed on a door front of a refrigerator, and here, the outer appearance of the door front is formed according to a user's preference by detachably configuring the decoration panel.

However, the refrigerator of the Cited Reference 1 has a problem in that, when a user wants to change the outer appearance, the entire decoration panel needs to be removed and replaced, and it is not possible to use the decoration panel before replacement any longer.

To solve this limitation, Chinese Patent Application No. 103250018 (Cited Reference 2) discloses a refrigerator in which a reflective layer and a transparent panel are disposed on a door front and colored light emitting members are mounted on both side ends of the reflective layer to cause the transparent panel to glow with set color.

However, in the Cited Reference 2, since the light emitting member is disposed further inside the panel defining the front surface of the door, shadows are generated at both ends of the door during an operation of the light emitting member to cause a poor outer appearance.

Korean Patent Publication No. 10-0820355 (Cited Reference 3) discloses an LED driving device considering external illuminance.

Cited Reference 3 discloses a technology for measuring an illuminance value by detecting the intensity of external light in an illuminance sensor, and controlling the brightness of light emitted from an LED panel according to the measured illuminance value.

However, Cited Reference 3 discloses a technology for controlling the brightness of light using only the illuminance value without considering a relationship with a user.

SUMMARY

The present embodiment provides a refrigerator and a home appliance for changing the state of the refrigerator and changing a reference distance for detecting a user based on a detected illuminance value when the user approaches the refrigerator within the reference distance.

Optionally or additionally, the present embodiment provides a refrigerator and a home appliance for varying a door for generating light among a plurality of doors according to an illuminance.

Optionally or additionally, the present embodiment provides a refrigerator and a home appliance for controlling a light source according to an illuminance and a current time.

According to an aspect, a home appliance may include a cabinet having a space, and a door configured to open and close the space.

The door may include a light source.

The home appliance may include an illuminance sensor provided in the cabinet or the door and configured to detect illuminance.

The home appliance may further include a user detection sensor provided in the cabinet or the door and configured to detect user proximity.

The home appliance may further include a controller configured to control the light source based on information detected by the user detection sensor.

The light source may include a plurality of LEDs.

When a user is detected to approach the home appliance within a reference distance by the user detection sensor, the controller may control the light source of the door to be changed from a first state to a second state.

The reference distance may be set to be changeable based on one or more of an illuminance and current time detected by the illuminance sensor.

When an illuminance value detected by the illuminance sensor is equal to or greater than a reference illuminance value, the reference distance may be set to a first reference distance.

When the illuminance value detected by the illuminance sensor is less than the reference illuminance value, the reference distance may be set to a second reference distance longer than the first reference distance.

The reference illuminance value may be manually set in the home appliance, or may be set in a remote device. The reference illuminance value may be received from the remote device through a communicator, and may be stored in a memory of the home appliance.

When the current time satisfies a first time range, the reference distance may be set to a first reference distance. When the current time satisfies a second time range, the reference distance may be set to a longer second reference distance than the first reference distance.

The controller may determine an operation mode of the home appliance based on a current time and an illuminance detected by the illuminance sensor.

When the current time satisfies a first time range and a detected illuminance value satisfies a first illuminance range, the controller may set an operation mode of the home appliance to a first operation mode.

When the current time satisfies the first time range and the detected illuminance value satisfies a second illuminance range, the controller may set the operation mode of the home appliance to a second operation mode.

Brightness of light emitted from the light source when the light source is turned on in the first operation mode may be set to a first value. Brightness of light emitted from the light source when the light source is turned on in the second operation mode may be set to a second value.

A number of LEDs that are turned on in the first operation mode may be set to a first number. A number of LEDs that are turned on in the second operation mode may be set to a second number.

An illuminance value of the second illuminance range may be smaller than an illuminance value of the first illuminance range. The second value may be smaller than the first value, and the second number is smaller than the first number.

When a current time satisfies a second time range and a detected illuminance value satisfies the first illuminance range, the controller may set an operation mode of the home appliance to a third operation mode.

When the current time satisfies the second time range and the detected illuminance value satisfies the second illuminance range, the controller may set the operation mode of the home appliance to a fourth operation mode.

Brightness of light emitted from the light source when the light source is turned on in the first operation mode may be set to a third value. Brightness of light emitted from the light source when the light source is turned on in the fourth operation mode may be set to a fourth value.

A number of LEDs that are turned on in the third operation mode may be set to a third number. A number of LEDs that are turned on in the fourth operation mode may be set to a fourth number.

The third value may be equal to or smaller than the first value. The fourth value may be smaller than the second value and the third value.

The third number may be equal to or smaller than the first number.

The fourth number may be smaller than the second number and the third number.

A number of LEDs that are turned on or brightness of light emitted from a light source that is turned on may be manually set in a home appliance, or may be set in a remote device, may be received from the remote device through a communicator, and may be stored in a memory of the home appliance.

The door may include a plurality of doors.

When the current time satisfies the first time range or the detected illuminance value satisfies the first illuminance range, if a user is detected to approach the home appliance within a first reference distance by the user detection sensor, the controller may control the light source of each of the plurality of doors to be changed from a first state to a second state.

After the light source is changed from the first state to the second state, when the user is not detected to approach the home appliance within the first reference distance by the user detection sensor, a state of the light source may be changed to a previous state.

When the current time satisfies the second time range or the detected illuminance value satisfies the second illuminance range, if a user is detected to approach the home appliance within a second reference distance by the user detection sensor, the controller may control the light source of some of the plurality of doors to be changed from a first state to a second state.

After the light source of some of the plurality of doors is changed from the first state to the second state, when the user is detected to approach the home appliance within a smaller third reference distance than the second reference distance by the user detection sensor, the controller may control the light source of remaining doors of the plurality of doors to be changed from the first state to the second state.

The plurality of doors may include an upper door and a lower door, and the some doors may be lower doors and remaining doors are upper doors.

After the light source of each of the plurality of doors is changed from the first state to the second state, when the user is detected to be farther away from the home appliance than the second reference distance by the user detection sensor, a state of the light source may be changed to a previous state.

The home appliance may further include a motion sensor configured to detect a movement of an object on a floor on which the cabinet is placed.

In a state in which an illuminance value detected by the illuminance sensor is less than a reference illuminance value, when a movement of more than a set number of times is detected by the motion sensor, the controller may control the light source to be changed from the first state to a second state for a set time.

The first state may be an off state of the light source, and the second state may be an on state of the light source.

The first state may be a state in which the light source is turned on to emit light with first color. The second state may be a state in which the light source is turned on to emit light with second color.

According to another aspect, a refrigerator may include a cabinet having a storage room, a plurality of doors configured to open and close the storage room, at least one of the doors including a light source, an illuminance sensor configured to detect illuminance, a user detection sensor configured to detect user proximity, and a controller configured to control the light source based on information detected by the user detection sensor.

When a user is detected to approach the refrigerator within a reference distance by the user detection sensor, the controller may control the light source of one or more of the plurality of doors to be changed from a first state to a second state.

The reference distance may be set to be changeable based on an illuminance detected by the illuminance sensor.

DETAILED DESCRIPTION

Hereinafter, detailed embodiments will be described in detail with reference to the accompanying drawings. However, the present disclosure is limited to the embodiments in which the spirit of the present disclosure is proposed, and other degenerate idea or other embodiments included in the scope of the present disclosure may be easily proposed by addition, changes, deletions, etc. of other elements.

Hereinafter, a refrigerator will be described as an example of a home appliance, but the description of the refrigerator according to the present disclosure may be applied to various home appliances including a cabinet having a space therein and a door configured to open and close the space. The home appliance may include, for example, an air conditioner, a clothes manager, a washing machine, a dryer, a dish washing machine, a cooking appliance, and the like.

Furthermore, a home appliance according to the present disclosure is not limited to a home appliance in which an inner space of a cabinet is opened and closed, and it is to be noted that the home appliance according to the present disclosure is also applicable to a home appliance in which an inner space of a cabinet is not opened and closed.

Prior to a description, directions are defined. In an embodiment of the present disclosure, a direction toward a door is defined as a front direction with respect to a cabinet shown in FIGS. 1 and 2, a direction toward the cabinet with respect to the door is defined as a rear direction, a direction toward a bottom on which a refrigerator is installed is defined as a downward direction, and a direction away from the bottom is defined as an upward direction.

Figure 1:
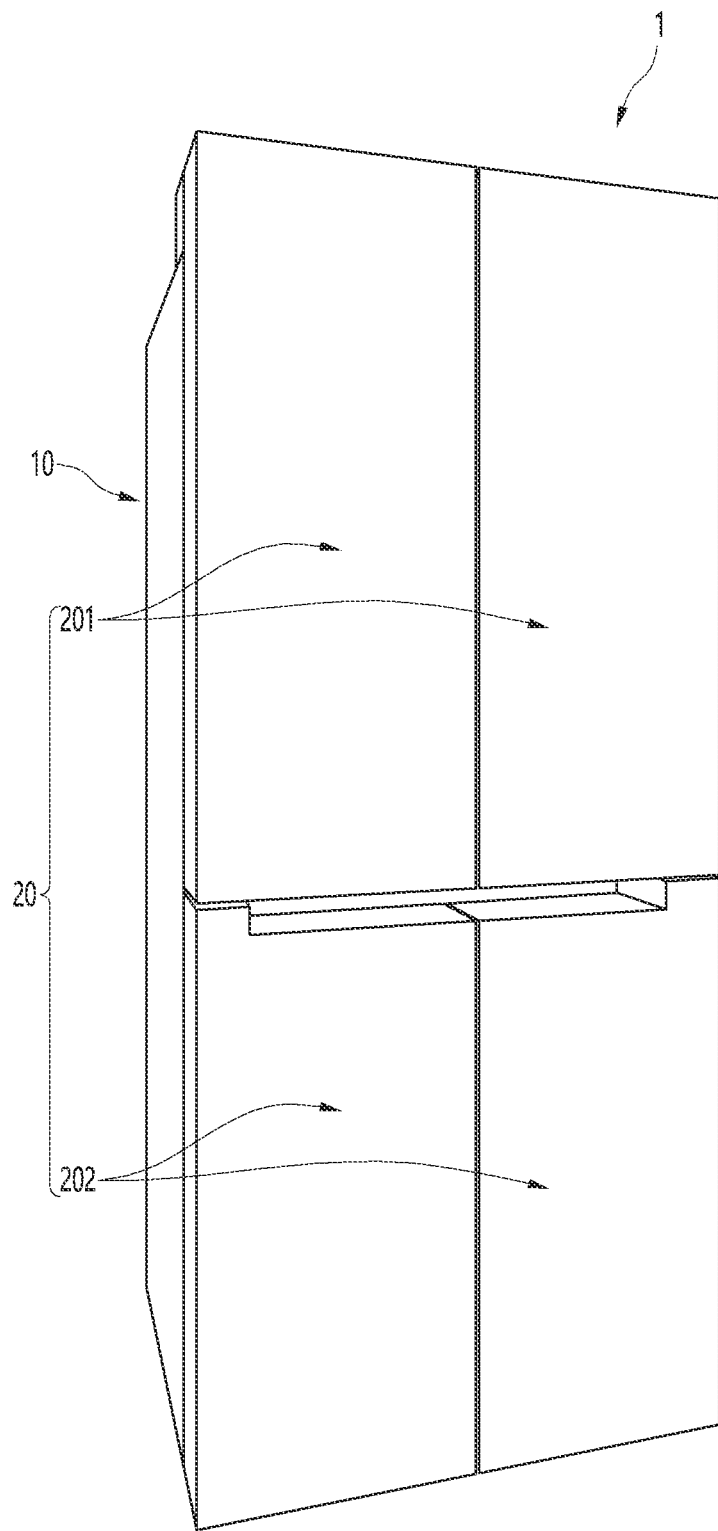
FIG. 1 is a front view of a refrigerator according to an embodiment of the present disclosure.

FIG. 1 is a perspective view of a refrigerator according to an embodiment.

Referring to FIGS. 1, a refrigerator 1 according to an embodiment of the present disclosure may include a cabinet 10 defining a storage space (or storage section) and a door 20 for opening and closing the storage space of the cabinet 10.

For example, the cabinet 10 may form the storage space partitioned in a vertical direction, a refrigerating compartment may be formed at an upper portion, and a freezing compartment may be formed at a lower portion. The refrigerating compartment may be referred to as an upper storage space, and the freezing compartment may be referred to as a lower storage space.

The door 20 may open and close each of the refrigerating compartment and the freezing compartment. For example, the door 20 may be rotatably mounted on the cabinet 10, and the refrigerating compartment and the freezing compartment may each be opened and closed by rotation. Alternatively, the door 20 may be configured to open and close the refrigerating compartment and/or the freezing compartment by being drawn in and out.

The door 20 may include a refrigerating compartment door 201 for opening and closing the refrigerating compartment and a freezing compartment door 202 for opening and closing the freezing compartment. The refrigerating compartment door 201 may be referred to as an upper door, and the freezing compartment door 202 may be referred to as a lower door.

The refrigerating compartment door 201 may include a pair of a left refrigerating compartment door and a right refrigerating compartment door that are arranged side by side. The left refrigerating compartment door and the right refrigerating compartment door may open and close the refrigerating compartment while being independently rotated. The left refrigerating compartment door and the right refrigerating compartment door may be disposed adjacent to each other and may have the same size.

The freezing compartment door 202 may include a pair of a left freezing compartment door and a right freezing compartment door that are arranged side by side. The left freezing compartment door and the right freezing compartment door may open and close the freezing compartment while being independently rotated. The left freezing compartment door and the right freezing compartment door may be disposed adjacent to each other and may have the same size.

Needless to say, although a refrigerator having a structure in which the refrigerating compartment is defined above the freezing compartment is described as an example in this embodiment, the present disclosure may be applied to all types of refrigerators equipped with a door without being limited to a type of a refrigerator.

An outer appearance of the front surface of the refrigerator 1 may be formed in the state in which the door 20 is closed and may form the out appearance of the refrigerator 1 viewed from the front in the state in which the refrigerator 1 is installed.

The door 20 may have a structure in which a front surface selectively emits light and may be configured to glow with set color or brightness. Thus, a user may change front color or brightness of the door 20 without separating or disassembling the door 20 and may change the overall outer appearance of the refrigerator 1.

Hereinafter, the structure of the door 20 will be described in detail with reference to drawings.

Figure 2:
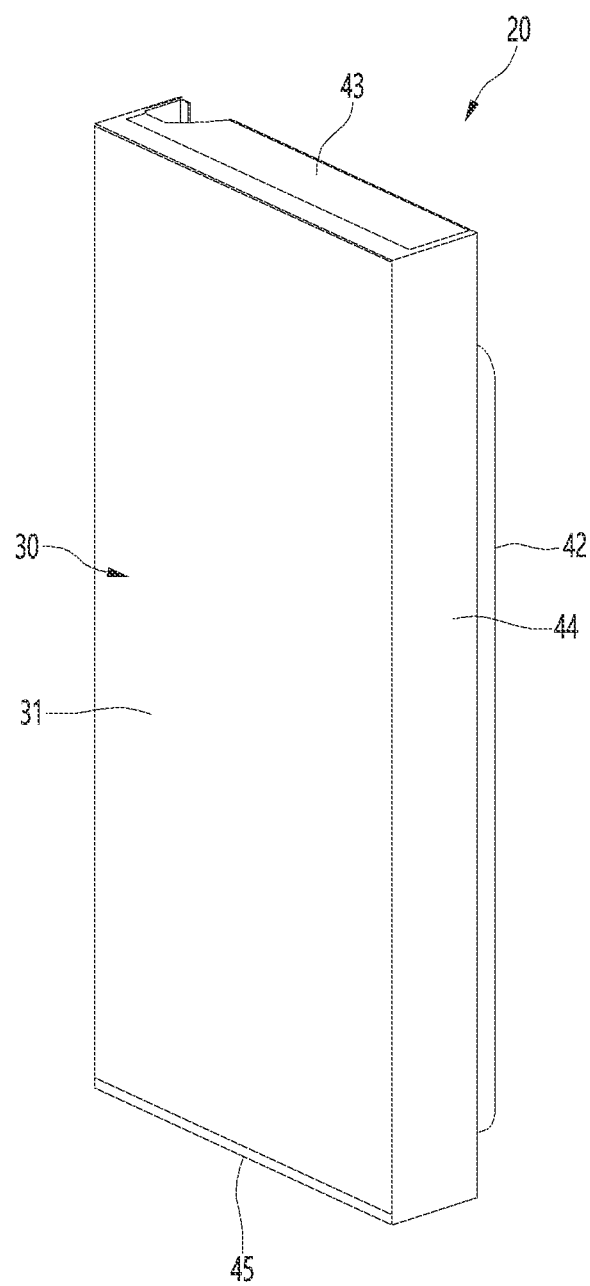
FIG. 2 is a perspective view of a refrigerator door according to an embodiment present disclosure.
Figure 3:
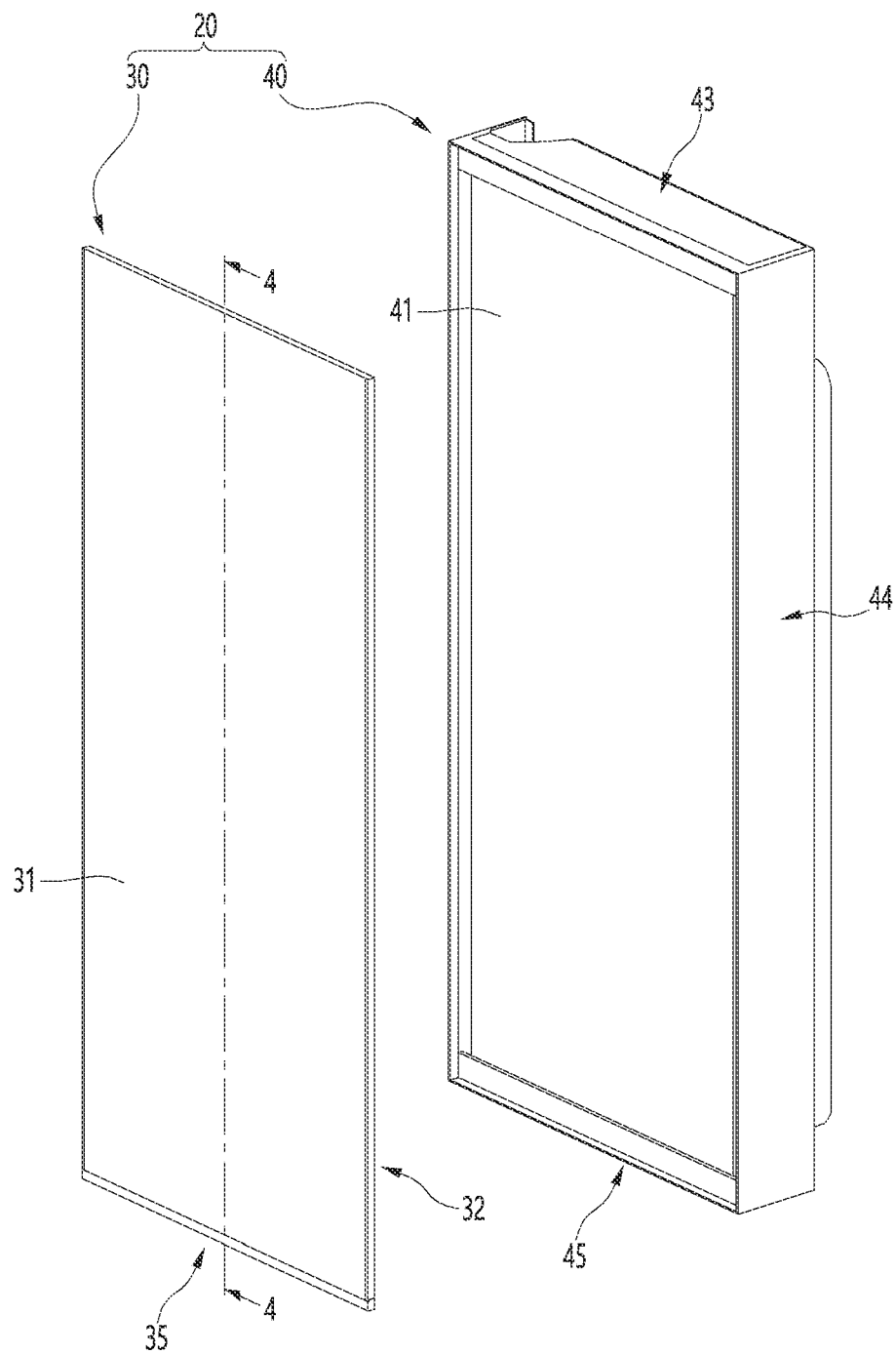
FIG. 3 is a view illustrating a state in which a panel assembly is separated from the refrigerator door.

FIG. 2 is a perspective view of a refrigerator door according to an embodiment present disclosure. FIG. 3 is a view illustrating a state in which a panel assembly is separated from the refrigerator door.

As illustrated in FIGS. 2 and 3, the door 20 may include a door body 21 forming the overall shape of the door 20, and a panel assembly 30 forming a front appearance of the door 20. That is, the door 20 may be configured in such a way that the panel assembly 30 is mounted on a front surface of the door body 40.

The door body 40 may include a body plate 41 defining a front surface and a door liner 42 defining a, rear surface.

The body plate 41 may be formed of a metal material and may be formed in a plate shape having a size corresponding to the panel assembly 30. The door liner 42 may be formed of a plastic material and may form a bottom shape of the door 20.

The door body 40 may further include a side decoration 44 forming right and left side surfaces of the door body 21.

The side decoration 44 may connect right and left side ends of the body plate 41 and right and left side ends of the door liner 42.

The door body 40 may include an upper cap decoration 43 and a lower cap decoration 45 that form top and bottom surfaces of the door body 40. The upper cap decoration 43 may be connected to an upper end of the side decoration 44, an upper end of the body plate 41, and an upper end of the door liner 42. The lower cap decoration 45 may be connected to a lower end of the side decoration 44, a lower end of the body plate 41, and a lower end of the door liner 42.

An outer appearance of the door body 40 may be formed by the body plate 41, the door liner 42, the side decoration 44, the upper cap decoration 43, and the lower cap decoration 45.

An insulator may be filled in an internal space of the door body 40, which is formed by coupling the body plate 41, the door liner 42, the side decoration 44, the upper cap decoration 43, and the lower cap decoration 45, and may provide an insulation structure to prevent heat from being transferred through the door 20. The insulator may be formed, for example, as a time elapses after a foaming liquid is filled. The door body 40 may be provided with an injection hole for filling the foaming liquid.

An opened forward panel receiving space 410 may be formed on a front surface of the door body 40. That is, front ends of the side decoration 44, the upper cap decoration 43, and the lower cap decoration 45 may protrude more forward than the front surface of the body plate 41.

A panel receiving space 410 that is opened forward may be defined at a front side of the door body 40. The panel receiving space 410 may be formed with a size corresponding to the size of the panel assembly 30 and the panel assembly 30 may be inserted into the panel receiving space 410. A circumference of the panel assembly 30 may be supported by a circumferential surface of the panel receiving space 410, that is, protruding portions of the side decoration 44, the upper cap decoration 43, and the lower cap decoration 45.

The panel assembly 30 may be formed in a plate shape as a whole and may be formed with a size corresponding to a front surface of the door body 40. Thus, when the panel assembly 30 is mounted on the front surface of the door body 40, the panel assembly 30 may shield the front surface of the door body 40 and may form an outer appearance of the front surface of the door 20. Since the panel assembly 30 may form the outer appearance of the front surface of the door 20, the panel assembly 30 may be referred to as a door panel, and since the panel assembly 30 may form the outer appearance of the front surface of the refrigerator 1, the panel assembly 30 may also be referred to as an exterior panel.

In the state in which the panel assembly 30 is mounted on the door body 40, a rear surface of the panel assembly 30 may be fixed in contact with the body plate 41. To fixedly mount the panel assembly 30, a lower end of the panel assembly 30 may be caught and restrained with a lower end of the lower cap decoration 45, and an upper end of the panel assembly 30 may be coupled to an upper end of a front surface of the upper cap decoration 43 to firmly couple the panel assembly 30 to the door body 40. The panel assembly 30 may be detachably mounted from the door body 40 for services and maintenance.

A front surface of the panel assembly 30 may be exposed forward in the state in which the panel assembly 30 is mounted on the door body 40, and the panel assembly 30 may substantially form the outer appearance of the front surface of the door 20. The panel assembly 30 may be configured to emit light from an entire front thereof and may be configured to glow with various colors.

To this end, a lighting device 36 may be provided inside the panel assembly 30. A wire (not shown) may be connected to the lighting device 36 in order to supply and control power. The wire (not shown) may be exposed outside the rear surface of the panel assembly 30, and a connector (not shown) may be provided on an end of the wire (not shown).

A structure connected to the connector of the wire to supply power to the lighting device 36 may be provided on a front surface of the door body 40.

Hereinafter, the structure of the panel assembly 30 will be described in more detail with reference to drawings.

Figure 4:
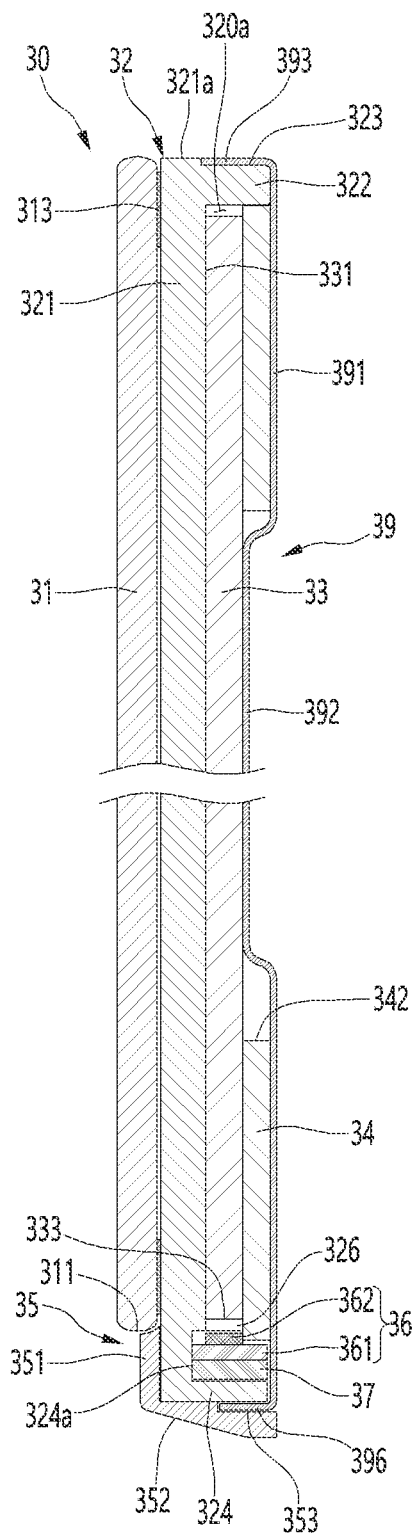
FIG. 4 is a cross-sectional view taken along line 4-4 of FIG. 3.
Figure 5:
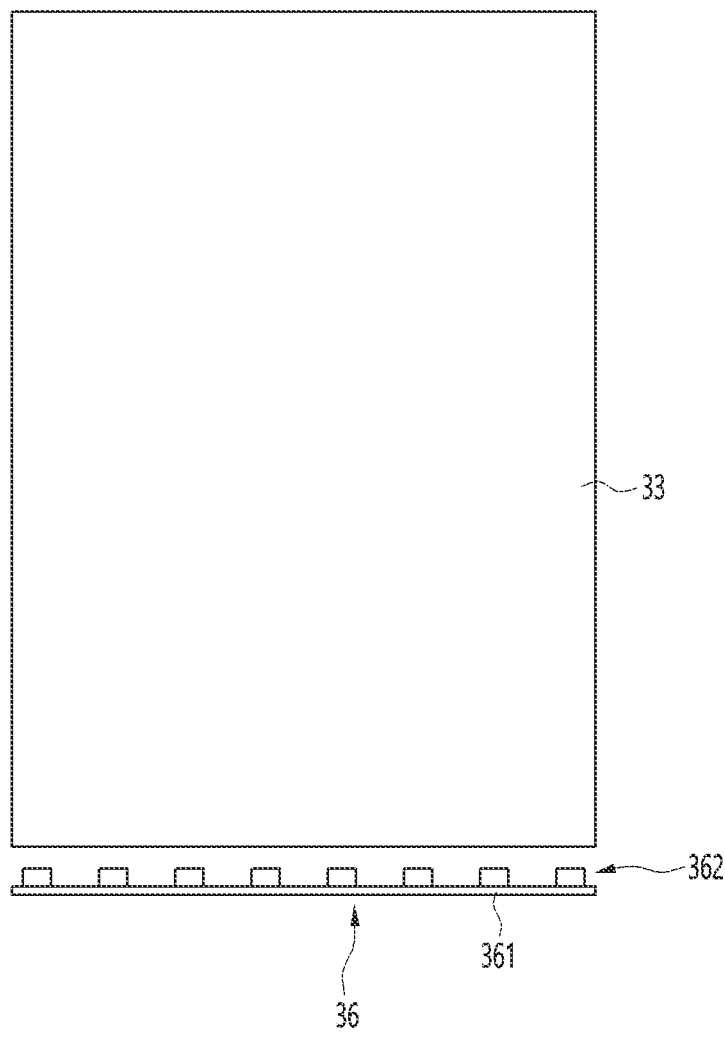
FIG. 5 is a view illustrating arrangement of a light guide plate and a light source.

FIG. 4 is a cross-sectional view taken along line 4-4 of FIG. 3. FIG. 5 is a view illustrating arrangement of a light guide plate and a light source.

Referring to FIGS. 4 and 5, the panel assembly 30 may include a front plate 31 forming an outer appearance of the front surface, the lighting device 36 for emitting light to cause the front plate 31 to glow, a light guide plate 33 for guiding the light emitted from the lighting device 36, and a diffusion member 32 allowing the light guide plate 33 to be spaced apart from the front plate 31 and diffusing the light. The diffusion member 32 may also be referred to as a support member in terms of supporting the light guide plate 33.

The lighting device 36 and the light guide plate 33 may be mounted or supported on the diffusion member 32.

The panel assembly 30 may further include a back cover 39 defining a rear surface of the panel assembly 30.

The front plate 31 may be formed in a rectangular plate shape and may be formed of a material that transmits light therethrough. For example the front plate 31 may be formed of a glass material such as blue glass, white glass, and vapor deposition glass or may be formed of other materials for transmitting light therethrough, such as ABS, PMMA, or PC. The front plate 31 may be referred to as a transparent plate or an out plate.

The front plate 31 may be formed to be transparent to allow light reflected by the light guide plate 33 to be transmitted. In this case, transparency may be defined to a degree to which light reflected from the light guide plate is transmitted and irradiated to the outside.

The front plate 31 may be formed to have color and may be formed to represent different colors depending on an operation or on and off states of the lighting device 36. For example, a specific design or pattern may be printed on the front plate 31 to have specific color. A film with a specific design or pattern printed thereon may be added to the front plate 31, surface treatment such as imprinting, etching, and glass printing may be performed on the front plate 31, or a coating or deposition layer having specific color and texture may be formed to form an outer appearance of the front plate 31.

The front plate 31 may be configured to transmit light emitted from the lighting device 36 but components behind the front plate 31 may not be seen therethrough. That is, in the state in which the lighting device 36 is turned off, components inside the panel assembly 30 may be prevented from being seen to the outside through the front plate 31 due to the color of the front plate 31.

In this case, a color layer having color may be formed on the front plate 31. In an off state, the color layer may be formed to have at least color having brightness equal to or greater than 0 other than black. That is, in a state in which the refrigerator 1 is installed, the front surface of the refrigerator 1 may be displayed in a color other than black, and the front color of the refrigerator may be changed according to an operation of the lighting device 36.

In the panel assembly 30, the entire front surface of the front plate 31 may be exposed to the outside. Thus, the light diffused by the diffusion member 32 may be transmitted through the front plate 31 as a whole, and thus, the entire front surface of the front plate 31 may glow.

A rear surface of the front plate 31 may be coupled to a front surface of the diffusion member 32.

The light guide plate 33 may be positioned at a rear spaced apart from the front plate 31 by the diffusion member 32 and may be configured to guide light emitted from the lighting device 36 disposed at the upper end of the light guide plate 33 forward.

For example, the light guide plate 33 may be formed of transparent acrylic, plastic, or a transparent polymer material. The light guide plate 33 may have a diffusing agent added thereto for diffusing light entrance on the light guide plate 33 or a pattern for diffusing light may be further formed on the light guide plate 33. Thus, light may be transferred to the front plate 31 by the light guide plate 33, and in this case, a pattern of the light guide plate 33 may be set to cause the entire front surface of the front plate 31 to glow with uniform brightness.

A load of the light guide plate 33 may be supported by the diffusion member 32 and a front surface of the light guide plate 33 may be pressed toward the diffusion member 32 by the back cover 39.

The diffusion member 32 may be disposed between the front plate 31 and the light guide plate 33. The diffusion member 32 may allow the light guide plate 33 to be maintained at a predetermined distance from the front plate 31 and may diffuse light emitted from the light emission surface of the light guide plate 33.

The front surface of the diffusion member 32 may support the front plate 31 and opposite side surfaces of the diffusion member 32 may restrain both ends of the light guide plate 33. The front surface of the diffusion member 32 may have a size greater than or equal to that of the light guide plate 33, and in the state in which the light guide plate 33 is mounted, the rear surface of the diffusion member 32 and the light guide plate 33 may be maintained in the state of being in surface contact with each other.

The diffusion member 32 may include a plate-shaped front surface portion 321, on which the front plate 31 is mounted, and an extension portion extending from a circumference of the front surface portion 321. The front surface portion 321 and the extension portion may define an accommodation space 320a in which the light guide plate 33 is disposed.

The extension portion is disposed to cover the circumference of the light guide plate 33. The circumference of the light guide plate 33 may include, for example, a top surface, a bottom surface, and both side surfaces.

For example, the extension portion may include an upper extension portion 322 extending from an upper end of a rear surface of the front surface portion 321, a lower extension portion 324 extending from a lower end of the rear surface of the front surface portion 321, and a pair of side surface portions extending from both left and right ends of the front surface portion 321.

The upper extension portion 322, the lower extension portion 324, and the pair of side surface portions may define the accommodation space 320a in which the light guide plate 33 is disposed. Thus, the diffusion member 32 not only serves to diffuse light, but also serves to accommodate and support the light guide plate 33.

The front surface portion 321 may be formed like a plate corresponding to the front plate 31, and a front surface of the light guide plate 33 may be in close contact with a rear surface of the front surface portion 321.

According to this embodiment, since the front surface portion 321 of the diffusion member 32 is entirely disposed between the front plate 31 and the light guide plate 33, even if the light guide plate 33 is deformed by the heat, the light guide plate 33 may be prevented from being in direct contact with the front plate 31. Thus, it is possible to prevent a dark area such as stains from occurring on the front plate 31.

The front surface portion 321 and the rear surface of the front plate 31 may be coupled to each other by an adhesion portion 313. The adhesion portion 313 may include, for example, a sealant or a double-sided tape.

The side surface portions may extend backward from right and left side ends of the front surface portion 321 and may be formed to restrain right and left side ends of the light guide plate 33. The side surface portions may be spaced apart from at least one of both left and right side surfaces of the light guide plate 33. When the light guide plate 33 moves to left and right sides, the side surface portions may be in contact with at least one surface of both the left and right side surfaces to restrict the at least one surface. When it is considered that the light guide plate 33 is expanded by heat, the side surface portions may be spaced apart from at least one of the left and right side surfaces of the light guide plate 33.

Each of the upper extension portion 322 and the lower extension portion 324 extends backward from the front surface portion 321, and a length of each of the upper extension portion 322 and the lower extension portion 324 is greater than a thickness of the light guide plate 33.

The diffusion member 32 may be made of a material for transmitting light therethrough and may be entirely formed by injection or extrusion as a single component.

The diffusion member 32 may be made of a transparent or translucent material as a whole. The diffusion member 32 itself may be provided to have a color. Thus, when viewed from the front of the panel assembly 30, a color, texture, or shape of the front surface of the panel assembly 30 may be determined by the diffusion member 32.

The diffusion member 32 may further include a light guide plate support 326 supporting a bottom surface 333 of the light guide plate 33. The light guide plate support 326 may extend backward from the rear surface of the front surface portion 321 and may be disposed above the lower extension portion 324 to be spaced apart from the lower extension portion 324.

To stably support the load of the light guide plate 33, the diffusion member 32 may include a plurality of light guide plate supports 326. The plurality of light guide plate supports 326 may be disposed to be spaced apart from each other in the horizontal direction.

The lighting device 36 may be accommodated in the diffusion member 32. The diffusion member 32 may include a receiving groove 324a (or receiving portion) that receives a portion of the lighting device 36.

The receiving groove 324a may be defined as a rear portion of the front surface portion 321 is recessed forward. Thus, the portion in which the receiving groove 324a is defined in the front surface portion 321 may be thinner than other portions.

The receiving groove 324a may be defined between the light guide plate support 326 and the lower extension portion 324. Thus, when the lighting device 36 is received in the receiving groove 324a, the lighting device 36 may be disposed below the light guide plate support 326.

The lighting device 36 may include a substrate 361 and the light source 362. The substrate 361 may be provided in a plate shape to be elongated in the left and right direction.

The plurality of light sources 362 may be arranged at a constant interval on the substrate 361. The light source 362 may be disposed to radiate light toward the bottom surface 333 of the light guide plate 33. That is, the bottom surface 333 of the light guide plate 33 is a light entrance surface, and the front surface 331 of the light guide plate 33 is the light emission surface.

The light source 362 may be disposed to emit light toward the lower end of the light guide plate 33.

The light source 362 may be disposed vertically below the bottom surface 333 of the light guide plate 33, i.e., may be disposed to face the bottom surface 333 of the light guide plate 33.

The light source 362 may be provided as, for example, an LED. The light source 362 may be configured as an RGB LED capable of irradiating light with various colors according to a control of the controller 13, which will be described later. That is, the light source 362 may emit light with various colors under control of the controller 13 that will be described later, and thus the front plate 31 may glow with color set by the controller 13. A color of the front appearance of the refrigerator 1 may be determined according to color of the front plate 31.

The light source 362 may include a light emitting diode (LED) for emitting light with specific color other than the RGB LED and may include a combination of a plurality of LEDs for emitting light with different colors. For example, the plurality of light sources 362 may include red, green, and blue LEDs and may sequentially and repeatedly arranged. Under control of the controller 13, operations of the light sources 362 may be combined to cause the front plate 31 to glow with desired color.

An interval between the light sources 362 may be smaller than the right and left width of the light guide plate support 326, and thus the light guide plate support 326 may be disposed between the light sources 362. Thus, the light emitted from the light source 362 may pass between two adjacent light guide plate supports 326 and be irradiated to the bottom surface 333 of the light guide plate 33.

The panel assembly 30 may further include a substrate supporter 37 seated on the lower extension portion 324 of the diffusion member 32.

The substrate supporter 37 may support the substrate 361 while being seated on the lower extension portion 324. A substrate supporter 37 may dissipate heat generated by the lighting device 36 by thermal conduction.

The substrate supporter 37 may be made of, for example, a metal material. For example, the substrate supporter 37 may be made of an aluminum material having high thermal conductivity. The substrate supporter 37 may be extruded with a metal material to have the same cross-sectional shape in the longitudinal direction.

A portion of the substrate supporter 37 may be received in the receiving groove 324a. The substrate supporter 37 may be in contact with the back cover 39 while the back cover 39 is assembled. Thus, the heat generated by the lighting device 36 may be transferred toward the back cover 39 through the substrate supporter 37 and may be dissipated through the back cover 39.

The panel assembly 30 may further include a rear supporter 34 supporting the rear surface of the light guide plate 33. The rear supporter 34 may be provided in a plate shape and may be attached to the rear surface of the light guide plate 33 by an adhesive.

The rear supporter 34 may be made of an opaque material through which light transmission is restricted. The rear supporter 34 may be accommodated in the accommodation space 320a defined by the diffusion member 32. The upper extension portion 322 may cover an upper side of the rear supporter 34, and the side portions 327 and 328 may cover both the side surfaces of the rear supporter 34.

A bottom surface of the rear supporter 34 may be disposed above the substrate 361. For example, a bottom surface of the rear supporter 34 may be seated on a top surface of the substrate 361.

In this case, the upward movement of the substrate 361 may be restricted by the rear supporter 34. Since the bottom surface 333 of the light guide plate 33 is seated on the top surface of the light guide plate support 226, a set interval may be maintained between the bottom surface of the light guide plate 33 and the light source 362.

As described above, the lighting device 36 may be maintained in the fixed state, and a distance between the light guide plate 33 and the light source 362 may also be maintained at a set distance, and thus, the light irradiated from the light source 362 may be incident into the light guide plate 33 at a designed angle. Thus, the light irradiated from the light source 362 may be effectively irradiated toward the light guide plate 33, and the light reflected through the light guide plate 33 may allow the front plate 31 to glow with set brightness.

In another aspect, the rear supporter 34 may be seated on the light guide plate support 326.

The rear supporter 34 may include an opening 342 through which a portion of the back cover 39 passes.

The back cover 39 may include a cover body 391 and a bent portion extending from an edge of the cover body 391 in the horizontal direction.

The cover body 391 may be in contact with the rear surface of the rear supporter 34. The cover body 391 may be attached to the rear supporter 34 by the adhesive or may be coupled to the rear supporter 34 by a coupling member such as a screw.

The bent portion may extend forward from the edge of the cover body 391 and may include an upper bent portion 393, a lower bent portion 396, and a pair of side bent portions. The bent portion may be in contact with the diffusion member 32. For example, the bent portion may adhere to the extension portion of the diffusion member 32 by the adhesive.

For example, the upper bent portion 393 may be seated in an upper seating groove 323 having a recessed shape defined in the upper extension portion 322 of the diffusion member 32.

The lower bent portion 396 may be in contact with a bottom surface of the lower extension portion 324 of the diffusion member 32. The side bent portions may be seated in the recessed side seating grooves defined in the side extension portions.

In this embodiment, since the diffusion member 32 supports the light guide plate 33 and fixes a position of the light guide plate 33, and the back cover 39 is coupled to surround a portion of the diffusion member 32, the number of components of the panel assembly 30 itself may be reduced to reduce a thickness of the panel assembly in the front and rear direction.

The cover body 391 may further include a pressing portion 392 bent toward the light guide plate 33. The pressing portion 392 may pass through the opening 342 of the rear supporter 34 so as to be in contact with the rear surface of the light guide plate 33.

In this embodiment, the cover body 391 may press the rear supporter 34 toward the rear surface side of the light guide plate 33 while being in contact with the rear surface of the rear supporter 34, and the pressing portion 392 may directly press the light guide plate 33.

The receiving groove 324a may be defined at a position equal to or lower than that of the bottom surface 311 of the front plate 31. That is, a portion of the front surface portion 321 may extend further downward than the bottom surface 311 of the front plate 31.

The diffusion member 32 may diffuse the light irradiated from the light emission surface of the light guide plate 33. Since a portion of the diffusion member 32 is disposed lower than the bottom surface 311 of the front plate 31, there is a possibility that the light passing through the diffusion member 32 is directly irradiated to the outside without passing through the front plate 31. To prevent this phenomenon, the panel assembly 30 according to this embodiment may further include a lower trim 35.

The lower trim 35 may be coupled to the diffusion member 32 by a coupling means such as an adhesion portion or a hook.

The lower trim 35 may include a first portion 351 extending in the vertical direction and a second portion 352 extending in the horizontal direction from a lower end of the first portion 351.

At least the first portion 351 may be provided to be transparent or translucent and, as necessary, may be provided with a specific color.

The first portion 351 may cover a portion of the diffusion member 32 extending downward from the bottom surface 311 of the front plate 31. For example, the first portion 351 may be disposed to face the receiving groove 324a in front of the receiving groove 324a in the diffusion member 32.

The second portion 352 may support the lower extension portion 324. The second portion 352 may include a seating groove 353 for seating the lower bent portion 396 of the back cover 39.

Figure 6:
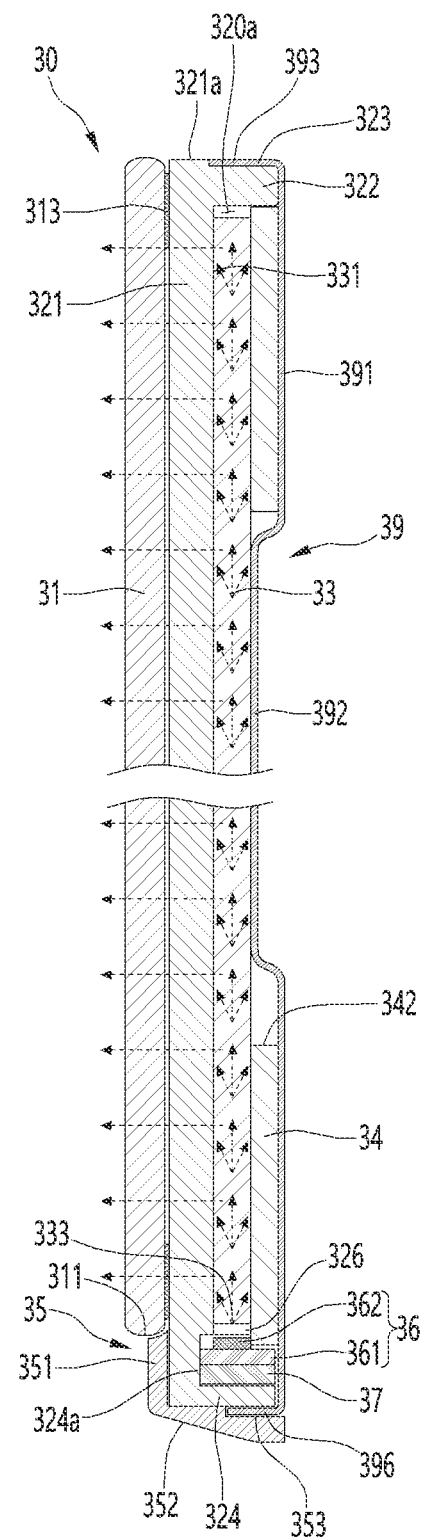
FIG. 6 is a vertical cross-sectional view showing a light emitting state of the panel assembly.
Figure 7:
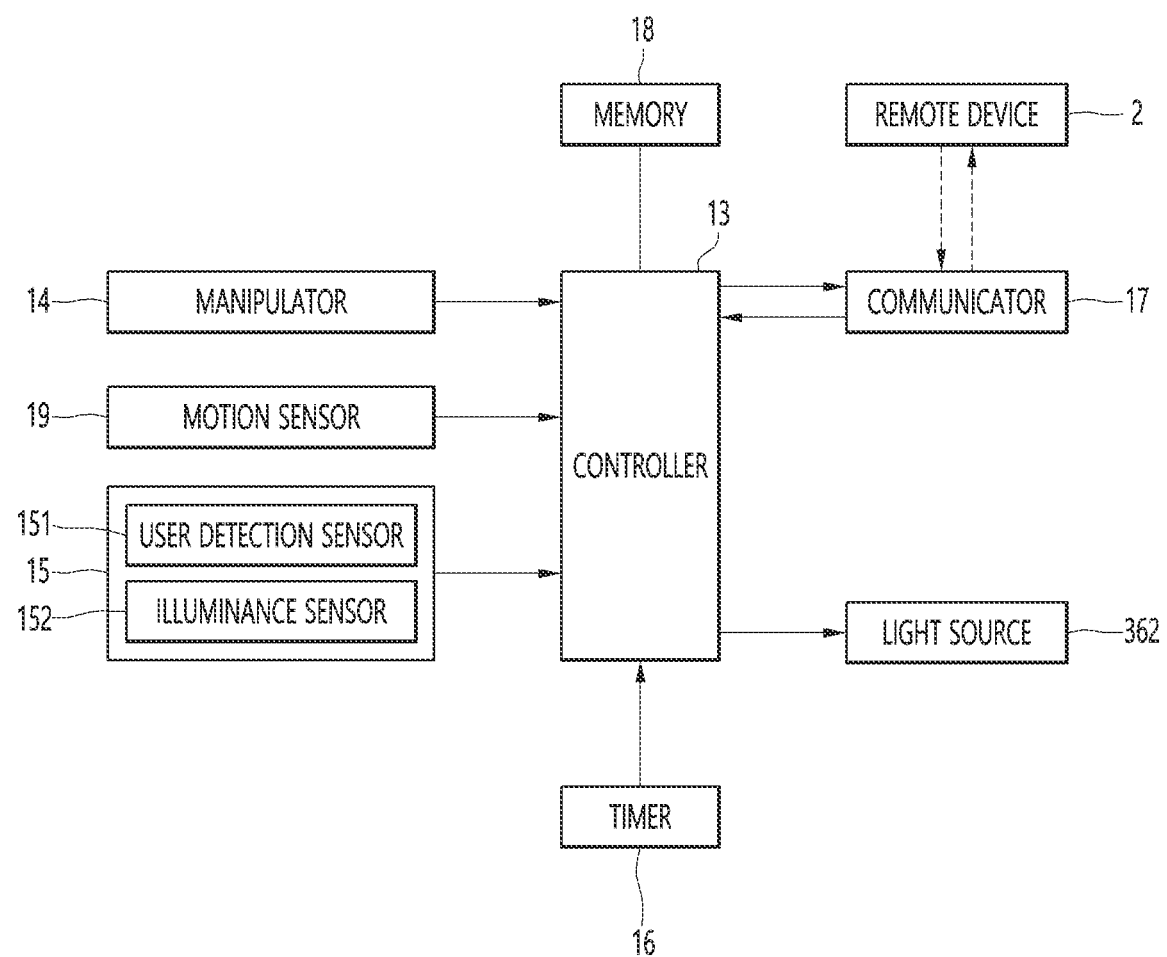
FIG. 7 is a block diagram illustrating a flow of a control signal of the refrigerator.
Figure 8:
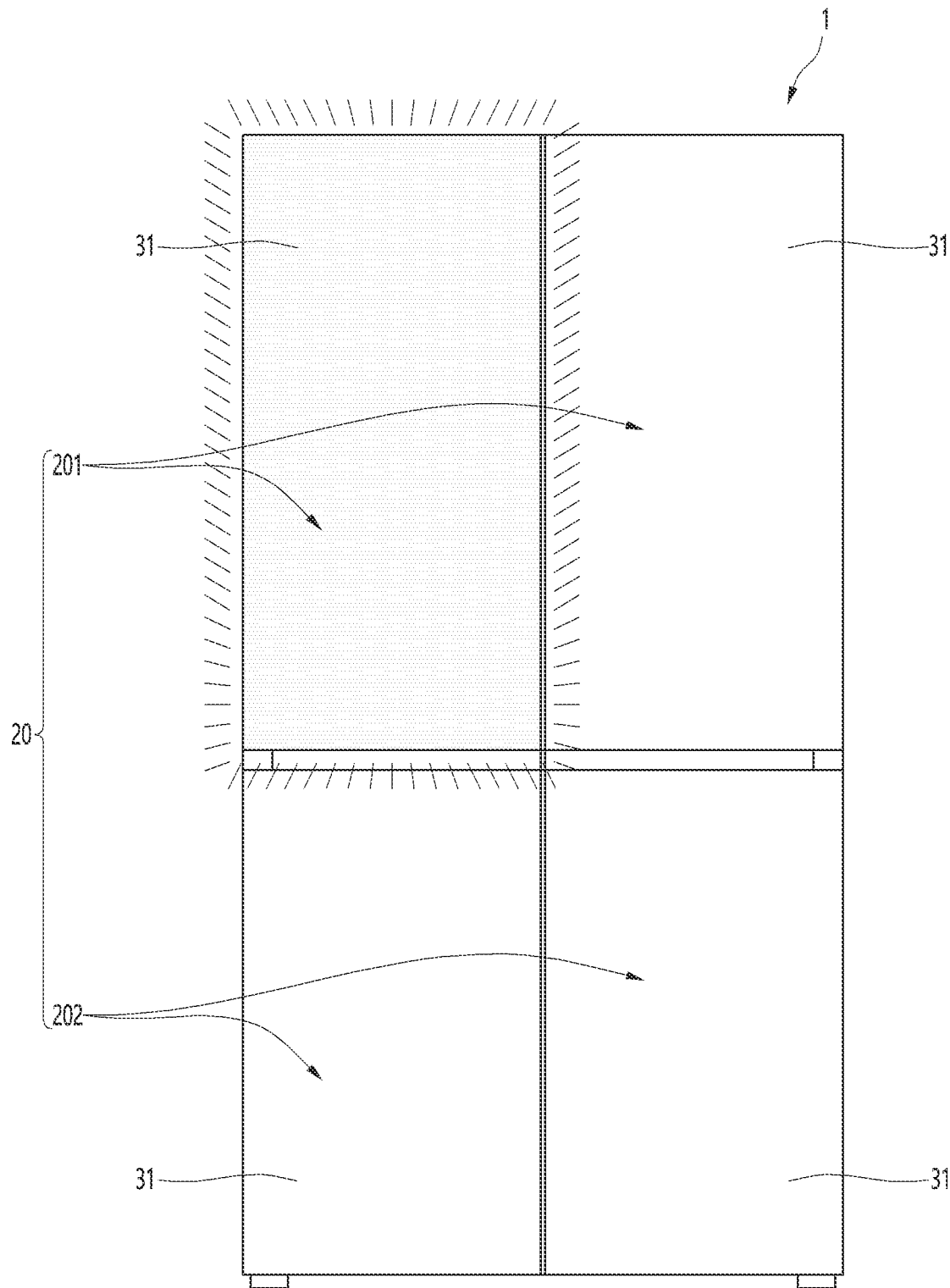
FIG. 8 is a view illustrating a state in which all doors glow in a refrigerator.
Figure 9:
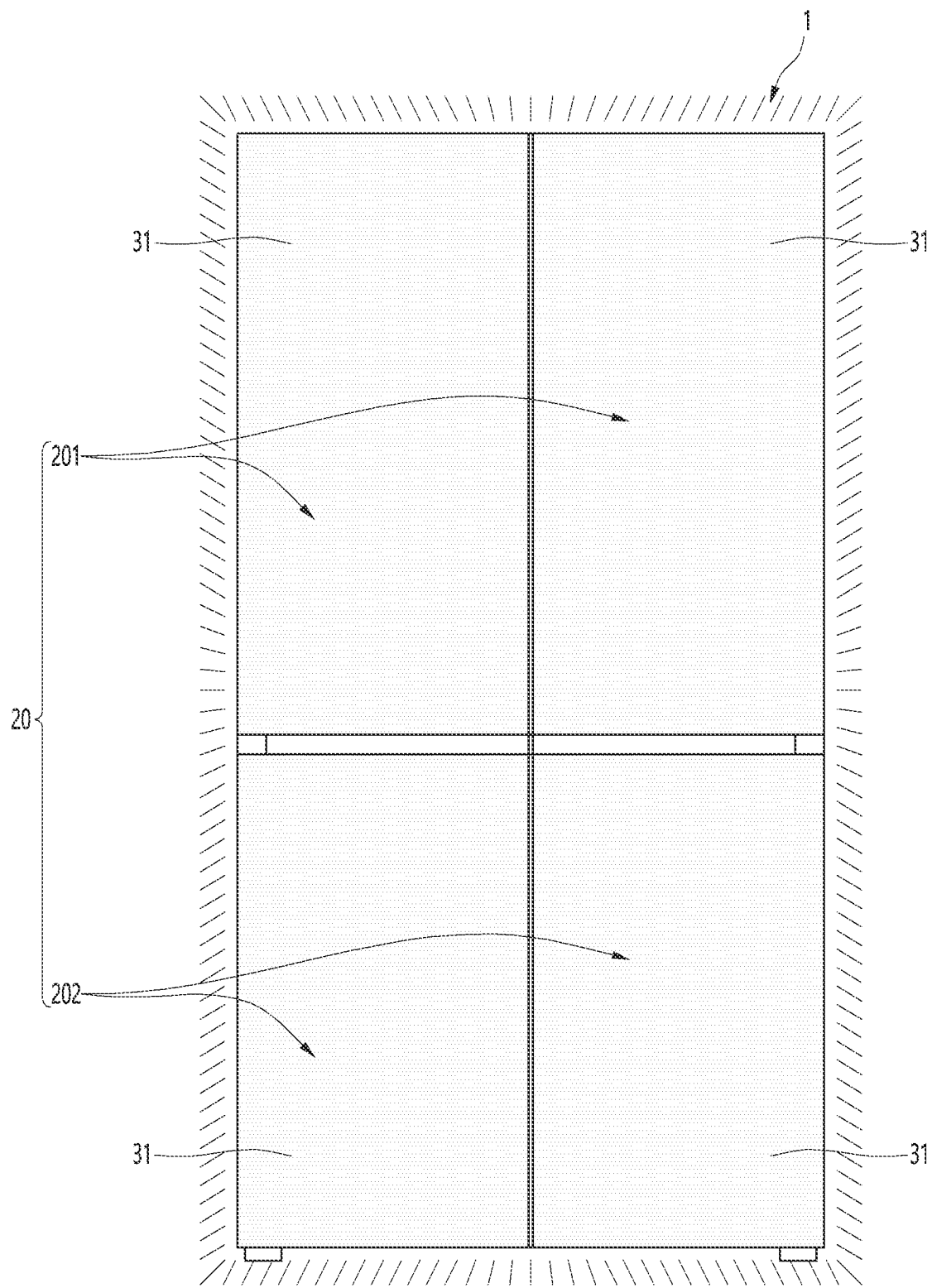
FIG. 9 is a view illustrating a state in which some doors of a plurality of doors glow.

FIG. 6 is a vertical cross-sectional view showing a light emitting state of the panel assembly. FIG. 7 is a block diagram illustrating a flow of a control signal of the refrigerator. FIG. 8 is a view illustrating a state in which all doors glow in a refrigerator. FIG. 9 is a view illustrating a state in which some doors of a plurality of doors glow.

Referring to FIGS. 6 to 9, in the refrigerator 1 according to an embodiment of the present disclosure, a front surface of the door 20 may glow via an operation of the lighting device 36.

The front surface of the door 20 may glow with any one of a plurality of colors under control of the controller 13.

The operation of the lighting device 36 may be performed by manipulation of a manipulator 14 of a user. The manipulator 14 may be disposed at one side of the refrigerator 1, and for example, may be disposed at one side of the cabinet 10. Needless to say, as necessary, the manipulator 14 may be included in the door 20 or manipulation may be input by touching and manipulating the front plate 31. That is, the user may directly manipulate the manipulator 14 to set an operation of the lighting device 36 and may turn on or off the lighting device 36.

The user may set an operation state of the lighting device 36, such as an operation time and an operation condition of the lighting device 36 and emission color of the light source 362 through manipulation of the manipulator 14.

Various commands related to an operation of the refrigerator may be input through manipulation of the manipulator 14.

As necessary, the manipulator 14 may be configured as a display for information display and manipulation.

The lighting device 36 may also be manipulated in operation and set in operation condition through a remote device 2 spaced apart from the refrigerator 1. The refrigerator 1 may communicate with the remote device 2 through a communicator 17 connected to a controller 13, and the user may control an operation of the lighting device 36 through the remote device 2.

The communicator 17 may communicate with the remote device 2 and/or a server for managing the home appliance using various methods.

For example, the communicator 17 may have a configuration for communication using at least one method of wired, wireless, or short distance communication (Bluetooth, Wi-Fi, Zigbee, and NFC). The remote device 2 may be various devices that are capable of communicating, such as a dedicated terminal, a mobile phone, a tablet, a portable PC, a desktop PC, a remote control, or a Bluetooth speaker.

The user may manipulate and set the operation state of the lighting device 36, such as an operation time and an operation condition of the lighting device 36 and emission color through manipulation of the remote device 2. For example, the lighting device 36 may be simply manipulated and set through an application or a dedicated program installed in a portable phone of the user.

The communicator 17 may receive information about the current time through the remote device 2 or the server. The received current time information may be stored in a memory 18, and the controller 13 may recognize the current time in real time.

The refrigerator 1 may further include a timer 16. The timer 16 may count an elapsed time after a specific event occurs. For example, the refrigerator 1 may receive information about the current time through the communicator 17, and when communication failure of the communicator 17 is recognized (when a specific event occurs), the timer 16 may operate. In this case, in consideration of the time counted by the timer 16, the refrigerator 1 may indirectly recognize the current time. Then, when communication failure of the communicator 17 is released, the timer 16 may be stopped, and information on the current time determined based on the timer 16 may be changed to information about the current time received from the communicator 17.

The lighting device 36 may also be operated according to the detection result by a sensor 15.

The sensor may include a user detection sensor 151 for detecting proximity of the user. For example, the user detection sensor 151 may use various devices for detecting user approaching near the refrigerator, such as an infrared sensor, an ultrasonic sensor, or a laser sensor.

The user detection sensor 151 may be disposed at various positions for detecting proximity of the user, such as one side of the cabinet 10 or one side of the door 20, and may be disposed at various positions for detecting proximity of the user. A plurality of sensors may be disposed at different positions.

Thus, when the user approaches the refrigerator 1 by a reference distance for use of the refrigerator 1, the user detection sensor 151 may detect this and may transfer a signal to the controller 13 to turn on the lighting device 36. When the user moves away from the refrigerator 1, the user detection sensor 151 may detect this and may transfer a signal to the controller 13 to turn off the lighting device 36.

When the user detection sensor 151 is provided in the cabinet 10, the user detection sensor 151 may be located on a front surface of the cabinet 10 corresponding to a space between an upper door and a lower door. Since the upper door and the lower door are spaced apart, there may be a gap between the upper door and the lower door. Accordingly, when the user detection sensor 151 is disposed at a position corresponding to the gap, the user may be capable of approaching the user detection sensor 151.

The sensor 15 may further include an illuminance sensor 152. The illuminance sensor 152 may detect an illuminance around the refrigerator 1. The illuminance sensor 152 may be provided in the cabinet 10 or the door 20.

The refrigerator 1 may further include a motion sensor 19. The motion sensor 19 may detect a movement of a person, an object, an animal, etc. on the floor on which the refrigerator 1 is installed.

The motion sensor 19 may be installed in the lower door or installed at a lower position than the lower door in the cabinet 10. Needless to say, it may also be possible that the motion sensor 19 is installed in the upper door, however, it may be arranged to detect a motion on the floor in the upper door.

The operation state of the lighting device operated by the controller is now described. As shown in FIG. 6, when the lighting device 36 is turned on according to an instruction of the controller 13, light emitted from the light source 362 may be directed toward the bottom surface 333 of the light guide plate 33 and then guided along the light guide plate 33.

In this case, the light guided by the light guide plate 33 may pass through the light emission surface and be diffused while passing through the front surface portion 321, and then, may pass through the front plate 31 and be transmitted to the outside. Thus, the entire front plate 31 may brightly glow, and the front surface of the door 20 may glow with a set brightness or color.

The lighting device 36 may be turned on to cause the front surface of the door 20 to glow brightly, and the front surface of the door 20 may glow with set color by light emitted from the light source 362. In this case, the front color of the door 20 may be different color or brightness from in the state in which the lighting device 36 is turned off.

That is, a color of the front surface of the door 20 may be seen as a color of the front plate 31, and the texture and pattern disposed on the front plate 31 may be seen. In this case, the color of the front plate 31 may be color with a brightness greater than 0 and may be formed in a color other than black. The color of the front surface of the door 20 in the state in which the lighting device 36 is turned may also be referred to as a first color.

Thus, the front surface of the door 20 may be seen with color of the front plate 31, and in this case, components inside the panel assembly 30 may be seen through the front plate 31 and may not be seen to the outside by the color of the front plate 31.

In this state, the lighting device 36 may be turned on, and when the lighting device 36 is turned on, the front surface of the door 20 may glow with color set by the controller 13.

The controller 13 may control the front surface of the door 20 to glow with a second color different from the first color. The controller 13 may control the light source 362 to glow with the second color.

In this case, color emitted from the light source 362 may be different from the second color. That is, since the front plate 31 includes first color, if light of the second color is emitted from the light source 362, the light may interact with the first color while passing through the front plate 31 to actually glow with a third color.

Accordingly, in the present embodiment, control of the light source 362 to allow the door 20 to glow with a specific color may mean control of color emitted from the light source 362 in consideration of the color itself of the front plate 31.

That is, in the state in which the light source 362 is turned on, color with which the door 20 glows may be color formed by mixing color itself of the front plate 31 and color of light emitted from the light source 362.

Some of the plurality of doors 20 forming the front appearance of the refrigerator 1 may emit light or the plurality of doors 20 may independently emit light to form the front appearance of the refrigerator 1 with set color.

The refrigerator 1 may be operated to cause some doors 20 of a plurality of doors to glow or glow with specific color. That is, all the lighting devices 36 included in the doors 20 may not be operated, but instead, only some of all the doors 20 may glow. For example, any one door 201a of the refrigerating compartment door 201 may glow.

As necessary, the left refrigerating compartment door 201a and the right refrigerating compartment door 201b may glow with different colors. At least two of the doors 20 may be sequentially changed in color and at least two of the doors 20 may be sequentially turned on or off.

In this case, the lighting device 36 included in the panel assembly 30 may be controlled by the controller 13 according to the aforementioned various conditions.

The refrigerating compartment door or the freezing compartment door among the doors may be controlled to glow with different colors.

The controller 13 may control the lighting device 36 to cause one pair of the refrigerating compartment doors 201 to be seen with the first color. The controller 13 may control the lighting device 36 to cause one pair of the refrigerating compartment doors 201 to be seen with the second color.

That is, the refrigerating compartment door 201 and the freezing compartment door 202 may be distinguished therebetween with colors, and according to a temperature change inside the refrigerator, the colors of the refrigerating compartment door 201 and the freezing compartment door 202 may also be changed.

Thus, through the front color of the door 20, the user may intuitively recognize an operation state of each storage space as well as may distinguish between the refrigeration compartment and the freezing compartment.

Hereinafter, a detailed operation control of the lighting device 36 will be described.

For convenience of description, in the refrigerator, the upper two doors are referred to as a first door and a second door, and the two doors below the first door and the second door are referred to as a third door and a fourth door.

In the case of the upper first door and second door, the light source 362 may be located at a lower side of each of the first door and the second door. In the case of the lower third door and fourth door, the light source 362 may be positioned at an upper side of each of the third door and the fourth door. Needless to say, it may also be possible that the light source 362 is located at a lower side of each of the third door and the fourth door.

In addition, with respect to operation control of the lighting device 36 described below, the present disclosure is not limited to the configuration of the panel assembly described above. That is, at least one of a plurality of components configuring the panel assembly may be omitted, at least one of a plurality of components may be replaced with another component, or the location of at least one component among a plurality of components may be changed.

In the present specification, a state change of the light source 362 may include one or more of a case in which the light source 362 is changed from an off state to an on state, a case in which the light source 362 is changed from an on state to an off state, a case in which one or more LEDs are turned on in a state in which the light source 362 is turned off, a case in which the light source 362 is turned off in a state in which one or more LEDs are turned on, a case in which brightness of light emitted from the light source 362 is changed in a state in which the light source 362 is turned on, a case in which the brightness or color of light emitted from some of a plurality of LEDs is changed in a state in which the light source 362 is turned on, the number of LED lights is changed (an increase in the number of LED lights or a decrease in the number of LED lights), and a case in which color of light emitted from the light source 362 is changed in a state in which the light source 362 is turned on.

The state in which the light source 362 is turned on may mean a state in which all of a plurality of LEDs are turned on, and the state in which the light source 362 is turned off may mean a state in which all of the plurality of LEDs are turned off.

Figure 10:
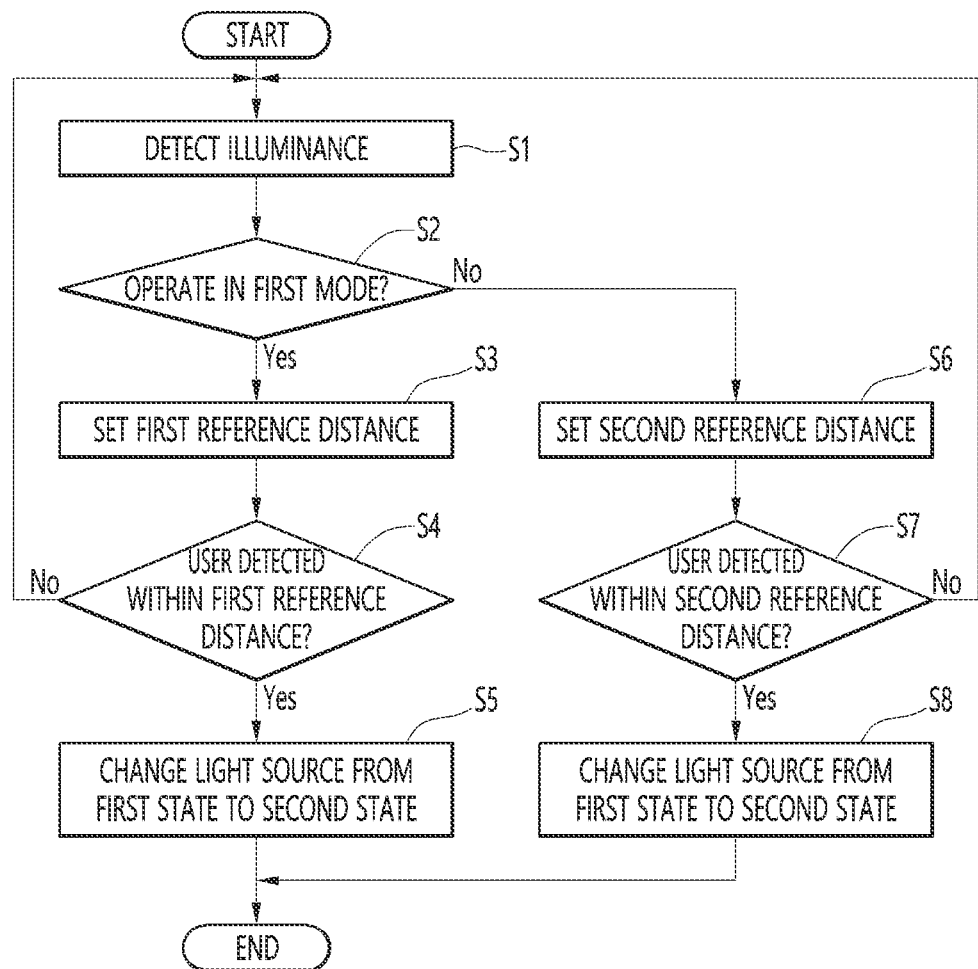
FIG. 10 is a flowchart for explaining a control method of differently setting a reference distance according to illuminance according to the present embodiment.

FIG. 10 is a flowchart for explaining a control method of differently setting a reference distance according to illuminance according to the present embodiment.

Referring to FIGS. 7 and 10, the illuminance sensor 152 may periodically detect the illuminance around the refrigerator 1 (S1).

The controller 13 may operate the mode of the refrigerator 1 as a first mode or the second mode according to the illuminance value detected by the illuminance sensor 152.

The controller 13 may determine whether the refrigerator 1 needs to be operated in the first mode according to the illuminance value detected by the illuminance sensor 152 (S2).

The controller 13 may operate the refrigerator 1 in the first mode when the illuminance value is greater than a reference illuminance value.

In the first mode, a reference distance for user proximity detection may be set to a first reference distance (S3).

In the state in which the first reference distance is set, when a user is detected to approach the refrigerator within the first reference distance by the user detection sensor 151, the controller 13 may control the light source 362 of one or more doors among a plurality of doors to change from the first state to the second state (S5).

On the other hand, as the determination result of operation S2, when the refrigerator 1 may not need to operate in the first mode, it may be determined that the refrigerator 1 needs to be operate in the second mode. That is, when the illuminance value is smaller than the reference illuminance value, the controller 13 may operate the refrigerator 1 in the second mode.

In the second mode, a reference distance for user proximity detection may be set as a second reference distance (S6).

That is, in the present embodiment, the reference distance may be variably set based on the illuminance sensed by the illuminance sensor 152.

In the state in which the second reference distance is set, when the user is detected to approach within the second reference distance by the user detection sensor 151, the controller 13 may control the light source 362 of one or more doors among a plurality of doors to change from the first state to the second state (S8).

For example, in operations S5 and S8, a state change of the light source may include a state in which the light source 362 of some of a plurality of doors are turned on or a state in which the light source 362 of each of a plurality of doors is turned off.

In the present embodiment, the second reference distance may be greater than the first reference distance.

The case in which the refrigerator operates in the second mode may be the case in which the illuminance around the refrigerator 1 is low. In this case, when the user approaches the refrigerator 1, the reference distance may be set as a second reference distance in order for the user to easily recognize the location of the refrigerator 1 from a distance.

When illuminance is low, the user may recognize the refrigerator only when the user approaches the refrigerator, and there is a risk that the user collides with a nearby object while approaching the refrigerator.

When illuminance is low, even if the user approaches the refrigerator 1 within the first reference distance, there may be a possibility that the user does not recognize the refrigerator 1. Therefore, as in the present disclosure, when the second reference distance greater than the first reference distance is set if illuminance is low, the user may easily recognize the refrigerator even at a location far away from the refrigerator, and thus the user may easily recognize the refrigerator, thereby preventing the user from colliding with a nearby object during a process of approaching the refrigerator.

As such, when the user approaches the refrigerator 1 within the second reference distance in the second mode, the light source 362 may be turned on, and thus the refrigerator may serve as a lighting.

When the refrigerator 1 serves as a lighting, the user may easily approach the refrigerator 1 as well as easily recognize an object around the refrigerator 1.

In contrast, the case in which the refrigerator operates in the first mode may be the case in which illuminance around the refrigerator 1 is high.

In this case, when the user approaches the refrigerator 1, there is a high possibility that the user recognizes the refrigerator even if a distance between the user and the refrigerator is the second reference distance.

Accordingly, in this case, the light source 362 may be turned on when the user approaches the first reference distance by setting the first reference distance smaller than the second reference distance. Accordingly, by reducing a time when the light source 362 is turned on, power consumption may be reduced. Also, it is possible to reduce frequent turning on of the light source 362.

In the first mode, when the user approaches the refrigerator 1 within the first reference distance and the light source 362 is turned on, the refrigerator 1 may change the user's mood as well as simply store food, the refrigerator 1 may serve as interior furniture.

Depending on the user's preference, the user may not want to change the state of the light source 362 when approaching the refrigerator. Accordingly, a function of changing the state of the light source 362 according to approach of the user may be set or release by user selection. For example, the user may set or release the function using the manipulator 14. Alternatively, the function may be set or released through the remote device 2.

If the brightness of light is the same when the light source 362 is turned on in each of the first mode and the second mode regardless of the illuminance, when the light source 362 is turned on in the second mode, light of the light source 362 may make a user feel glare.

Therefore, the brightness of light of the light source 362 when the light source 362 is on in the second mode may be smaller than the brightness of light of the light source 362 when the light source 362 is on in the first mode.

In the first mode, after the state of the light source 362 is changed, if a user is not detected within the first reference distance, the state of the light source 362 may be changed to a previous state. For example, the light source 362 may be turned off after being turned on.

In the second mode, after the state of the light source 362 is changed, if a user is not detected within the second reference distance, the state of the light source 362 may be changed to a previous state. For example, the light source 362 may be turned off after being turned on.

The first reference distance and the second reference distance may be set by a user. For example, the user may set or change each of the first reference distance and the second reference distance through the manipulator 14. Alternatively, each of the first reference distance and the second reference distance may be set or changed through the remote device 2, and the set or changed information may be received by the communicator 17 and stored in the memory 18.

However, a changeable reference distance range may be preset, and the user may select the first reference distance and the second reference distance within the corresponding range.

In another example, when the user selects a button such as "Register current distance" using a remote device while standing at a desired position, an actual distance from the refrigerator to the user may be set as a reference distance.

The reference illuminance value may also be set by a user. For example, the user may set and change the reference illuminance value through the manipulator 14. Alternatively, the reference illuminance value may be set and changed through the remote device 2, and the set and changed information may be received by the communicator 17 and stored in the memory 18.

However, a range of the changeable reference illuminance value may be preset, and the user may select the reference illuminance value within the corresponding range.

According to another embodiment, the reference distance may vary based on the current time. When the current time satisfies a first time range to be described later, the reference distance may be set as a first reference distance. On the other hand, when the current time satisfies a second time range to be described later, the reference distance may be set as a second reference distance. That is, step S1 in FIG. 10 may be changed to a step of recognizing the current time.

In another example, the reference distance may also be variably set based on the current time and the detected illuminance value.

Figure 11:
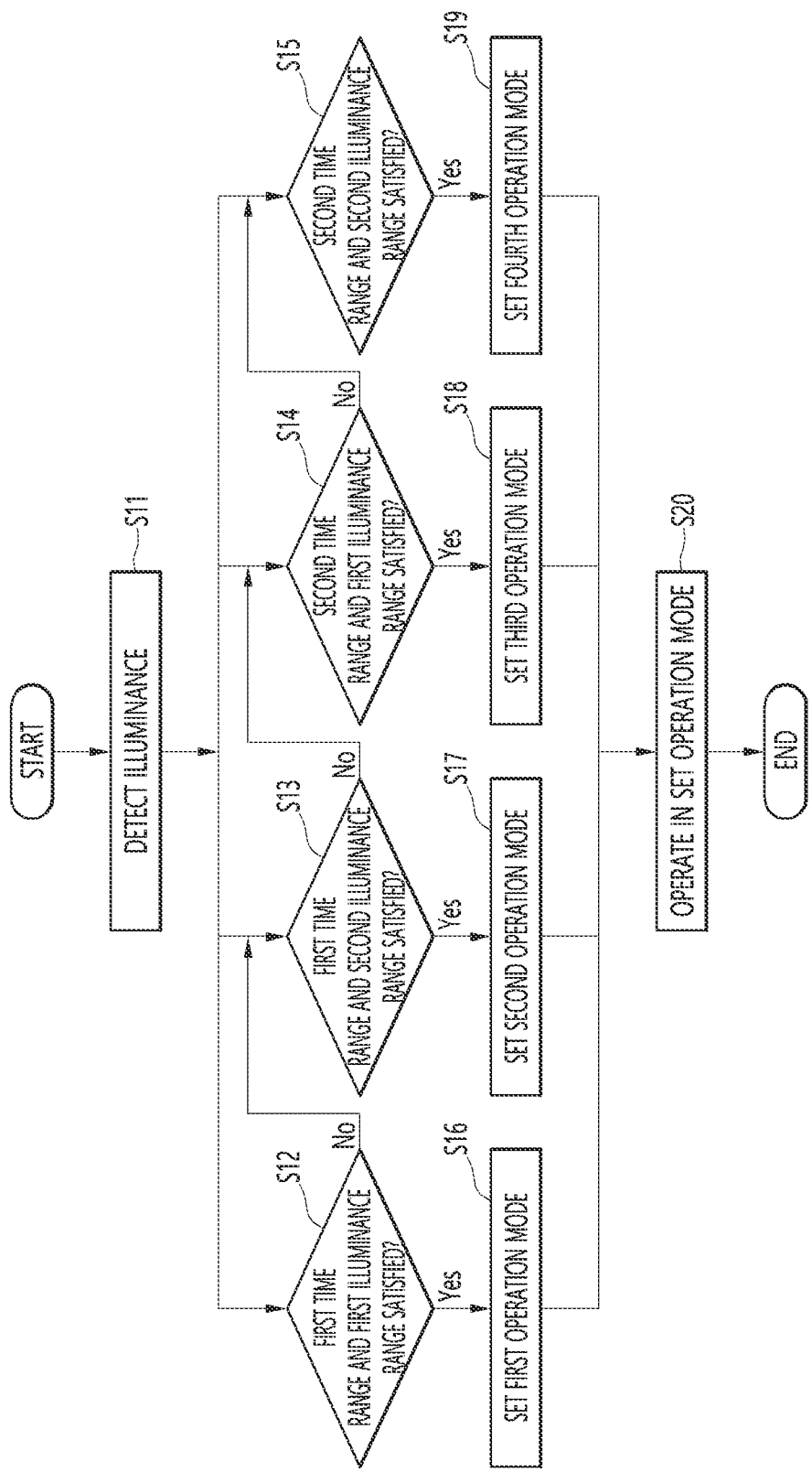
FIG. 11 is a flowchart for explaining a method of setting an operation mode according to illuminance and current time according to the present embodiment.

FIG. 11 is a flowchart for explaining a method of setting an operation mode according to illuminance and current time according to the present embodiment.

Referring to FIGS. 7 and 11, as described above, the controller 13 may recognize the current time.

The controller 13 may set an operation mode of the refrigerator 1 based on the illuminance value and current time detected by the illuminance sensor 152.

For example, the illuminance sensor 152 may continuously or periodically detect an illuminance around the refrigerator 1 (S11).

When the current time satisfies a first time range and the detected illuminance value satisfies a first illuminance range (S12), the controller 13 may set an operation mode of the refrigerator 1 to a first operation mode (S16).

The first time range may be set, for example, in the range of 6 am to 6 pm. The first illuminance range may be set to a range greater than or equal to the reference illuminance value.

For example, the first operation mode may be set when the illuminance around the refrigerator 1 is high in the daytime.

When the current time satisfies a first time range and the detected illuminance value satisfies a second illuminance range (S13), the controller 13 may set an operation mode of the refrigerator 1 to a second operation mode (S17).

The second illuminance range may be set to a range less than the reference illuminance value.

For example, the second operation mode may be set when the illuminance around the refrigerator 1 is low in the daytime.

When the current time satisfies a second time range and the detected illuminance value satisfies the first illuminance range (S14), the controller 13 may set an operation mode of the refrigerator 1 to a third operation mode (S18).

The second time range may be set, for example, in the range of 6 pm to 6 am. The first time range and the second time range may be set or changed by a user.

For example, the third operation mode may be set when the illuminance around the refrigerator 1 is high in the evening.

When the current time satisfies a second time range and the detected illuminance value satisfies the second illuminance range (S15), the controller 13 may set an operation mode of the refrigerator 1 to a fourth operation mode (S19).

For example, the fourth operation mode may be set when the illuminance around the refrigerator 1 is low in the evening.

The controller 13 may control the refrigerator 1 in the set operation mode.

In the first operation mode, when the light source 362 is turned on in a specific door, the brightness of light emitted from the light source 362 may be set to a first value.

In the second operation mode, when the light source 362 is turned on in a specific door, the brightness of light emitted from the light source 362 may be set to a second value. The second value may be smaller than the first value. Although not limited, the second value may be 50% of the first value.

In the third operation mode, when the light source 362 is turned on in a specific door, the brightness of light emitted from the light source 362 may be set to a third value. In this case, the third value may be equal to or smaller than the first value.

In the fourth operation mode, when the light source 362 is turned on in a specific door, the brightness of light emitted from the light source 362 may be set to a fourth value. In this case, the fourth value may be smaller than the second value and the third value. The fourth value may be 25% of the first value.

In another example, in the first operation mode, when the light source 362 is turned on in a specific door, the number of LEDs that are turned on may be set to a first number.

In the second operation mode, when the light source 362 of a specific door is turned on, the number of LEDs that are turned on may be set to a second number. The second number may be smaller than the first number. Although not limited, the second number may be 50% of the first number.

In the third operation mode, when the light source 362 of a specific door is turned on, the number of LEDs that are turned on may be set to a third number. The third number may be equal to or smaller than the first number.

In the fourth operation mode, when the light source 362 of a specific door is turned on, the number of LEDs that are turned on may be set to a fourth number. The fourth number may be smaller than the second number and the third number. Although not limited, the fourth number may be 25% of the first number.

The above-mentioned values for the brightness and the number of LEDs that are turned on may be manually set and changed by a user.

According to the present embodiment, if the illuminance is low even in the daytime, the brightness of light may be set to be large when the light source 362 is turned on, and if the illuminance is high even in the night, the brightness of light may be set to be small when the light source 362 is turned on.

Figure 12:
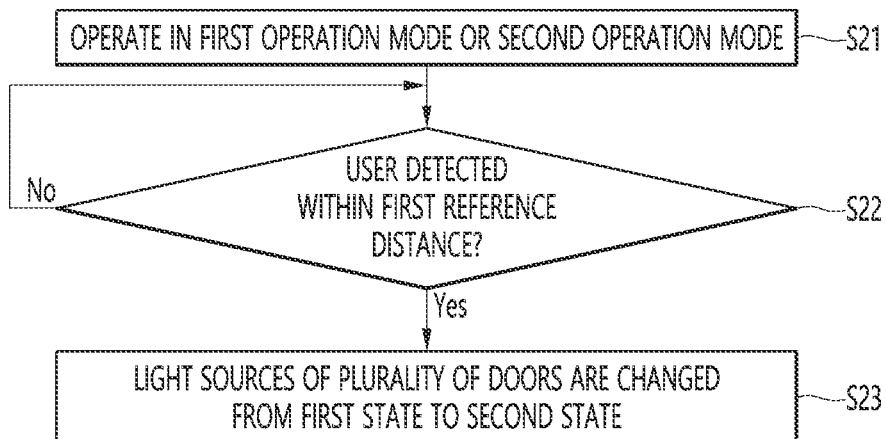
FIG. 12 is a flowchart for explaining a method of controlling a refrigerator during an operation in a first operation mode or a second operation mode.
Figure 13:
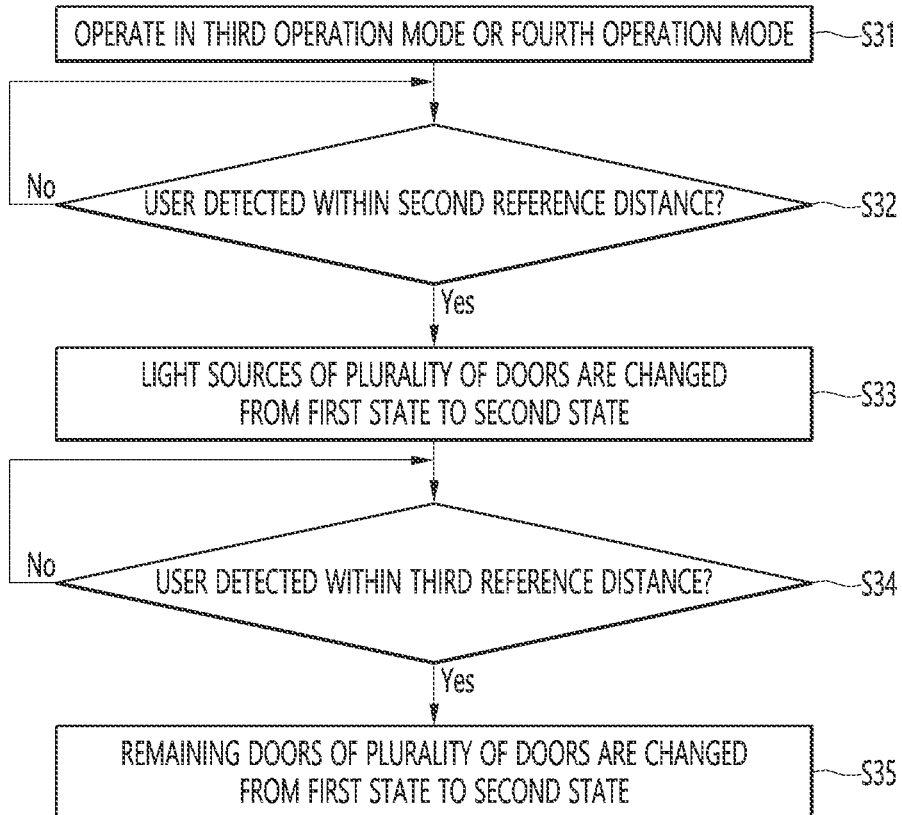
FIG. 13 is a flowchart for explaining a method of controlling a refrigerator during an operation in a third operation mode or a fourth operation mode.

FIG. 12 is a flowchart for explaining a method of controlling a refrigerator during an operation in a first operation mode or a second operation mode. FIG. 13 is a flowchart for explaining a method of controlling a refrigerator during an operation in a third operation mode or a fourth operation mode.

FIGS. 12 and 13 illustrate an example of setting a reference distance based on a current time.

First, referring to FIG. 12, the refrigerator 1 may be operated in a first operation mode or a second operation mode within the first time range (e.g., daytime) (S21).

In the first operation mode or the second operation mode, the reference distance may be set to the first reference distance.

The controller 13 may determine whether the user is detected to approach the refrigerator within the first reference distance by the user detection sensor 151 (S22).

When determining that the user approaches the refrigerator within the first reference distance, the controller 13 may control the light source 362 of each of the plurality of doors to be changed from the first state to the second state (S23). For example, the light source 362 of each of the plurality of doors may be turned on.

The color of light emitted from the light source 362 when the light source 362 is turned on may be manually set and changed by the user.

In the state in which the light source 362 is turned on, when it is determined that the user is detected to approach the refrigerator within the first reference distance, the color of the light source 362 may be changed. For example, while the light source 362 is turned on to emit light with first color, if it is determined that the user is detected to approach the refrigerator within the first reference distance, the color of light emitted from the light source 362 may be changed to second color.

As described above, the brightness of light of the light source 362 in the first operation mode may be different from the brightness of light of the light source 362 in the second operation mode.

In the first time range, even when the light source 362 of each of the plurality of doors is turned on, the user does not feel glare, and the entire refrigerator may serve as a lighting or interior furniture.

Hereinafter, referring to FIG. 13, the refrigerator 1 may be operated in a third operation mode or a fourth operation mode within the second time range (e.g., daytime) (S31).

In the third operation mode or the fourth operation mode, the reference distance may be set to the first reference distance.

The controller 13 may determine whether the user is detected to approach the refrigerator within the second reference distance by the user detection sensor 151 (S32).

When determining that the user approaches the refrigerator within the second reference distance, the controller 13 may control the light source 362 of some of the plurality of doors to be changed from the first state to the second state (S33).

For example, the light source 362 of a lower door of the plurality of doors may be turned on. The color of light emitted from the light source 362 when the light source 362 is turned on may be manually set and changed by the user.

Generally, when an adult approaches the refrigerator 1, the eyes of the adult may be positioned higher than the lower door. If the user approaches the refrigerator 1 within the second reference distance and the light source of the upper door may be turned on, the user may feel glare.

On the other hand, according to the present embodiment, when the user approaches the refrigerator within the second reference distance and the light source of the lower door is turned on, the lower door may act as an indirect lighting while the user does not feel glare.

After the user is detected to approach the refrigerator within the second reference distance, the controller 13 may determine whether the user is detected to approach the refrigerator within the third reference distance by the sensor 15 (S34).

The third reference distance may be smaller than the second reference distance.

When determining that the user is detected to approach the refrigerator within the third reference distance, the controller 13 may control the light source 362 of the remaining doors of the plurality of doors to be changed from the first state to the second state (S35).

When the user is detected to approach the refrigerator within the third reference distance after the light source 362 of the lower door is turned on, the light source 362 of the upper door may be additionally turned on.

As described above, the brightness of light of the light source 362 in the third operation mode may be different from the brightness of light of the light source 362 in the fourth operation mode.

After the light source 362 of each of the plurality of doors is changed from the first state to the second state, when the user is not detected to approach the refrigerator within the second reference distance (when the user is farther away from the refrigerator than the second reference distance), the controller 13 may control the light source 362 to be changed to a previous state.

In another example, when the reference distance is to be changed based on the sensed illuminance value, operation S21 in FIG. 12 may be replaced with an operation performed in the first operation mode or the third operation mode. In addition, operation S31 in FIG. 13 may be replaced with a step performed in the second operation mode or the fourth operation mode.

Figure 14:
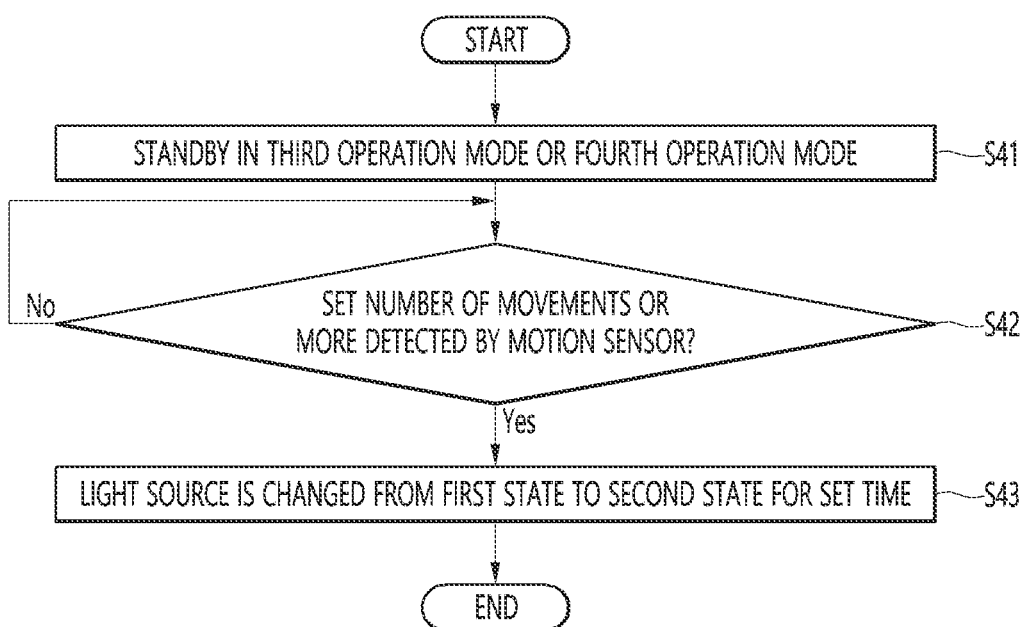
FIG. 14 is a diagram for explaining a method of controlling a refrigerator according to motion detection of a motion sensor when the refrigerator operates in the third operation mode or the fourth operation mode.

FIG. 14 is a diagram for explaining a method of controlling a refrigerator according to motion detection of a motion sensor when the refrigerator operates in the third operation mode or the fourth operation mode.

Referring to FIG. 14, the refrigerator 1 may operate in the third operation mode or fourth operation mode described with reference to FIG. 13.

In this state, the motion sensor 19 may detect a motion of a person, an object, an animal, or the like around the refrigerator 1.

The controller 13 may determine whether or not a set number of movements or more are detected by the motion sensor 19 (S42).

As the result of determination in operation S42, if it is determined that a movement of more than the set number of times is detected by the motion sensor 19, the controller 13 may control the light source of some of the plurality of doors to be changed from the first state to the second state during a set time (S43).

A case in which the motion sensor 19 detects a movement more than the set number of times may be, for example, a case in which a pet frequently moves around the refrigerator. In this case, the light source of at least one door among the plurality of doors may be turned on in such a way that the refrigerator is capable of serving as a lighting.

In this case, even if the user does not approach the refrigerator within the second reference distance, the refrigerator may serve as an indirect lighting, and the light source of the lower door may be turned on to minimize fatigue of the eyes of the user.

After the light source of at least one door among the plurality of doors is changed from the first state to the second state for a set time, the light source 362 may be changed to a previous state. That is, the light source 362 that is turned on may be turned off.

In the present specification, when the user approaches the refrigerator within the reference distance, the state of the light source may be changed, and the reference distance for user detection may be changed based on the detected illuminance value.

When the illuminance value is low, if the reference distance is increased, the user may easily recognize a home appliance from a distance, thereby preventing the user from colliding with structures around the refrigerator while the user approaches the refrigerator.

In the present specification, according to the illuminance, the door capable of emitting light among the plurality of doors may be changeable. As in one embodiment, when the light source of the lower door is turned on if the illuminance is low and a time zone is night, it may be possible to prevent the user from feeling glare and the home appliance may advantageously serve as an indirect lighting.

What is claimed is:

1. An appliance comprising:
   a cabinet that defines a storage space;
   a door configured to open and close at least a portion of the storage space, the door including a light source;
   a user detection sensor disposed at the cabinet or the door and configured to detect a proximity of a user from the appliance; and
   a controller configured to control the light source of the door,
   wherein the controller is configured to:
      receive a reference distance that is set or changed via (i) a manipulator of the appliance or (ii) a remote device, and
      control the light source of the door to change from a first state to a second state based on the user detection sensor detecting the user within the reference distance, and
   wherein the controller is configured to set the reference distance to be changeable based on a current time.

2. The appliance of claim 1, wherein the manipulator or the remote device is configured to provide a preset range of a changeable reference distance to thereby enable a selection of the reference distance within the preset range.

3. The appliance of claim 1, wherein the controller is configured to:
   based on the current time corresponding to a first time range, set a first reference distance as the reference distance; and
   based on the current time corresponding to a second time range, set a second reference distance as the reference distance, the second reference distance being different from the first reference distance.

4. The appliance of claim 1, wherein the controller is configured to, based on (i) the light source of the door being changed from the first state to the second state and (ii) the user detection sensor no longer detecting the user within the reference distance from the appliance, control the light source of the door to return to the first state.

5. The appliance of claim 1, wherein the first state is an off-state of the light source, and the second state is an on-state of the light source.

6. The appliance of claim 1, wherein the light source is configured to:
   based on operating in the first state, emit light in a first color; and
   based on operating in the second state, emit light in a second color different from the first color.

7. The appliance of claim 1, wherein the light source is configured to:
   based on operating in the first state, emit light with a first brightness; and
   based on operating in the second state, emit light with a second brightness different from the first brightness.

8. The appliance of claim 1, wherein the light source includes a plurality of light emitting diodes (LEDs), and
   wherein the controller is configured to:
      based on operating the light source in the first state, turn on a first number of LEDs among the plurality of LEDs; and
      based on operating the light source in the second state, turn on a second number of LEDs among the plurality of LEDs.

9. The appliance of claim 1, wherein the door is one of a plurality of doors, each of the plurality of doors including a light source, and
   wherein the controller is configured to, based on the user detection sensor detecting the user within the reference distance from the appliance, control the light source of each of the plurality of doors to change from the first state to the second state.

10. The appliance of claim 1, wherein the door is one of a plurality of doors, each of the plurality of doors including a light source, and
    wherein the controller is configured to, based on the user detection sensor detecting the user within the reference distance from the appliance, control the light source of at least one of the plurality of doors to change from the first state to the second state.

11. The appliance of claim 10, wherein the controller is configured to, based on (i) the light source of the at least one of the plurality of doors being changed from the first state to the second state and (ii) the user detection sensor detecting the user within a second reference distance from the appliance, control the light source of another door of the plurality of doors to change from the first state to the second state, the second reference distance being less than the reference distance.

12. The appliance of claim 11, wherein the controller is configured to, based on (i) the light source of each of the plurality of doors being changed from the first state to the second state and (ii) the user detection sensor no longer detecting the user within the reference distance from the appliance, control the light source of each of the plurality of doors to return to the first state.

13. An appliance comprising:
a cabinet that defines a storage space;
a door configured to open and close at least a portion of the storage space, the door including a light source;
an illuminance sensor disposed at the cabinet or the door and configured to detect an illuminance around the appliance;
a user detection sensor disposed at the cabinet or the door and configured to detect a proximity of a user from the appliance; and
a controller configured to control the light source of the door to change from a first state to a second state based on the user detection sensor detecting the user within a reference distance, and
wherein the controller is configured to:
based on an illuminance value detected by the illuminance sensor being greater than or equal to a reference illuminance value, set a first reference distance as the reference distance; and
based on the illuminance value detected by the illuminance sensor being less than the reference illuminance value, set a second reference distance as the reference distance, the second reference distance being greater than the first reference distance.

14. The appliance of claim 13, wherein the controller is configured to receive the reference illuminance value that is set via a manipulator of the appliance or set via a remote device, and
wherein the appliance further comprises a non-transitory memory configured to store the reference illuminance value.

15. An appliance comprising:
a cabinet that defines a storage space;
a door configured to open and close at least a portion of the storage space, the door including a light source;
an illuminance sensor disposed at the cabinet or the door and configured to detect an illuminance around the appliance;
a user detection sensor disposed at the cabinet or the door and configured to detect a proximity of a user from the appliance; and
a controller configured to control the light source of the door to change from a first state to a second state based on the user detection sensor detecting the user within a reference distance,
wherein the controller is configured to:
based on a current time and an illuminance value detected by the illuminance sensor, determine an operation mode of the appliance, wherein the operation mode of the appliance includes a first operation mode, a second operation mode, and a third operation mode,
based on (i) the current time corresponding to a first time range and (ii) the illuminance value corresponding to a first illuminance range, set the operation mode of the appliance to the first operation mode, and
based on (i) the current time corresponding to a second time range and (ii) the illuminance value corresponding to the first illuminance range, set the operation mode of the appliance to the third operation mode of the appliance.

16. The appliance of claim 15, wherein the operation mode of the appliance further includes a fourth operation mode,
wherein the controller is configured to:
based on (i) the current time corresponding to the first time range and (ii) the illuminance value corresponding to a second illuminance range, set the operation mode of the appliance to the second operation mode, and
based on (i) the current time corresponding to the second time range and (ii) the illuminance value corresponding to the second illuminance range, set the operation mode of the appliance to the fourth operation mode of the appliance.

17. The appliance of claim 16, wherein the controller is configured to:
based on setting the first operation mode, control the light source to emit light with a first brightness value; and
based on setting the second operation mode, control the light source to emit light with a second brightness value that is less than the first brightness value, and
wherein an illuminance value in the second illuminance range is less than an illuminance value in the first illuminance range.

18. The appliance of claim 17, wherein the controller is configured to:
based on setting the third operation mode, control the light source to emit light with a third brightness value that is less than or equal to the first brightness value; and
based on setting the fourth operation mode, control the light source to emit light with a fourth brightness value that is less than the second brightness value and the third brightness value.

19. The appliance of claim 16, wherein the controller is configured to:
based on setting the first operation mode, turn on a first number of light emitting diodes (LEDs) of the light source; and
based on setting the second operation mode, turn on a second number of LEDs of the light source, the second number being less than the first number.

20. The appliance of claim 19, wherein the controller is configured to:
based on setting the third operation mode, turn on a third number of LEDs of the light source, the third number being less than or equal to the first number; and
based on setting the fourth operation mode, turn on a fourth number of LEDs of the light source, the fourth number being less than the second number and the third number.

* * * * *